(12) United States Patent
Mori et al.

(10) Patent No.: US 11,165,383 B2
(45) Date of Patent: Nov. 2, 2021

(54) POWER CONVERSION DEVICE AND ELECTRIC POWER STEERING DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 40 days.

(21) Appl. No.: 16/634,248

(22) PCT Filed: Aug. 21, 2017

(86) PCT No.: PCT/JP2017/029824
§ 371 (c)(1),
(2) Date: Jan. 27, 2020

(87) PCT Pub. No.: WO2019/038814
PCT Pub. Date: Feb. 28, 2019

(65) Prior Publication Data
US 2020/0373869 A1 Nov. 26, 2020

(51) Int. Cl.
*H02P 27/12* (2006.01)
*H02P 21/22* (2016.01)
(Continued)

(52) U.S. Cl.
CPC ........ *H02P 27/12* (2013.01); *H02M 7/53871* (2013.01); *H02P 21/22* (2016.02); *B62D 5/0463* (2013.01); *H02P 2201/15* (2013.01)

(58) Field of Classification Search
CPC ........ H02P 27/12; H02P 27/085; H02P 21/50; H02P 21/12; H02P 21/22; H02P 2201/15;
(Continued)

(56) References Cited

U.S. PATENT DOCUMENTS 5,285,145 A * 2/1994 Minowa ............ H02M 7/53873
  318/802
5,475,293 A * 12/1995 Sakai ...................... H02P 21/04
  318/802
(Continued)

FOREIGN PATENT DOCUMENTS

WO 2014/097804 A1 6/2014

OTHER PUBLICATIONS

Nguyen et al., "A PWM strategy dedicated to RMS current reduction in DC link capacitor of an embedded three phase inverter", 2011 14th European Conference on Power Electronics and Applications (EPE 2011), Birmingham, UK, Aug. 1, 2011, pp. 1-9, XP055718713 (9pages total).
(Continued)

*Primary Examiner* — Rina I Duda
(74) *Attorney, Agent, or Firm* — Sughrue Mion, PLLC; Richard C. Turner

(57) ABSTRACT

A power conversion device is configured to output on/off signals for switching on and off respective semiconductor switching elements of an inverter configured to invert a DC voltage output from a DC power supply into three-phase AC voltages so that, out of a plurality of voltage vectors defined so as to correspond to patterns of the on/off signals, the second closest voltage vector and the third closest voltage vector in phase to a current vector that is based on currents supplied as a result of output of the three-phase AC voltages from the inverter are formed.

9 Claims, 17 Drawing Sheets

(51) Int. Cl.
*H02M 7/5387* (2007.01)
*B62D 5/04* (2006.01)

(58) Field of Classification Search
CPC .......... H02M 7/53871; H02M 7/53876; B62D 5/0463
See application file for complete search history.

(56) References Cited

U.S. PATENT DOCUMENTS

| | | | |
|---|---|---|---|
| 2003/0052643 A1* | 3/2003 | Sweo | H02P 21/34 318/801 |
| 2010/0117586 A1* | 5/2010 | Akiyama | H02P 21/0003 318/801 |
| 2010/0127646 A1* | 5/2010 | Biester | F16H 25/2454 318/373 |
| 2014/0207335 A1* | 7/2014 | Mikamo | B62D 5/046 701/41 |
| 2016/0028339 A1* | 1/2016 | Nakai | H02P 29/50 318/400.02 |
| 2016/0294317 A1 | 10/2016 | Nakai | |

OTHER PUBLICATIONS

Extended European Search Report dated Aug. 11, 2020 from the European Patent Office in Application No. 17922385.4.

* cited by examiner

FIG. 2

| θi [DEGREES] | VOLTAGE VECTORS TO BE OUTPUT | VOLTAGE VECTOR CLOSEST IN PHASE TO CURRENT VECTOR |
|---|---|---|
| 30~90 | V1, V3 | V2 |
| 90~150 | V2, V4 | V3 |
| 150~210 | V3, V5 | V4 |
| 210~270 | V2, V4 | V5 |
| 270~330 | V5, V1 | V6 |
| -30~30 | V6, V2 | V1 |

FIG.3

| Qup | Qun | Qvp | Qvn | Qwp | Qwn | VOLTAGE VECTOR | Iin |
|---|---|---|---|---|---|---|---|
| 0 | 1 | 0 | 1 | 0 | 1 | V0 | 0 |
| 1 | 0 | 0 | 1 | 0 | 1 | V1 | Iu |
| 1 | 0 | 1 | 0 | 0 | 1 | V2 | -Iw |
| 0 | 1 | 1 | 0 | 0 | 1 | V3 | Iv |
| 0 | 1 | 1 | 0 | 1 | 0 | V4 | -Iu |
| 0 | 1 | 0 | 1 | 1 | 0 | V5 | Iw |
| 1 | 0 | 0 | 1 | 1 | 0 | V6 | -Iv |
| 1 | 0 | 1 | 0 | 1 | 0 | V7 | 0 |

FIG. 6

| PHASE CONDITION FOR CURRENT VECTOR | OUTPUT DUTY OF EFFECTIVE VOLTAGE VECTOR | OUTPUT DUTY OF EFFECTIVE VOLTAGE VECTOR |
|---|---|---|
| $30° \leq \theta i < 90°$ | $D_1 = \sqrt{\dfrac{3}{2}} \dfrac{V_\alpha + \dfrac{1}{\sqrt{3}} V_\beta}{V_{dc}}$ | $D_3 = \sqrt{\dfrac{3}{2}} \dfrac{\dfrac{2}{\sqrt{3}} V_\beta}{V_{dc}}$ |
| $90° \leq \theta i < 150°$ | $D_2 = \sqrt{\dfrac{3}{2}} \dfrac{\dfrac{2}{\sqrt{3}} V_\beta}{V_{dc}}$ | $D_4 = \sqrt{\dfrac{3}{2}} \dfrac{-V_\alpha + \dfrac{1}{\sqrt{3}} V_\beta}{V_{dc}}$ |
| $150° \leq \theta i < 210°$ | $D_3 = \sqrt{\dfrac{3}{2}} \dfrac{-V_\alpha + \dfrac{1}{\sqrt{3}} V_\beta}{V_{dc}}$ | $D_5 = \sqrt{\dfrac{3}{2}} \dfrac{-V_\alpha - \dfrac{1}{\sqrt{3}} V_\beta}{V_{dc}}$ |
| $210° \leq \theta i < 270°$ | $D_4 = \sqrt{\dfrac{3}{2}} \dfrac{-V_\alpha - \dfrac{1}{\sqrt{3}} V_\beta}{V_{dc}}$ | $D_6 = \sqrt{\dfrac{3}{2}} \dfrac{-\dfrac{2}{\sqrt{3}} V_\beta}{V_{dc}}$ |
| $270° \leq \theta i < 330°$ | $D_5 = \sqrt{\dfrac{3}{2}} \dfrac{-\dfrac{2}{\sqrt{3}} V_\beta}{V_{dc}}$ | $D_1 = \sqrt{\dfrac{3}{2}} \dfrac{V_\alpha - \dfrac{1}{\sqrt{3}} V_\beta}{V_{dc}}$ |
| $-30° \leq \theta i < 30°$ | $D_6 = \sqrt{\dfrac{3}{2}} \dfrac{V_\alpha - \dfrac{1}{\sqrt{3}} V_\beta}{V_{dc}}$ | $D_2 = \sqrt{\dfrac{3}{2}} \dfrac{V_\alpha + \dfrac{1}{\sqrt{3}} V_\beta}{V_{dc}}$ |

FIG. 10

| θi[deg] | VOLTAGE VECTOR CLOSEST IN PHASE TO CURRENT VECTOR | VOLTAGE MODULATION METHOD | CARRIER WAVE INVERTED PHASE |
|---|---|---|---|
| 30~90 | V2 | LOWER SOLID TWO-PHASE MODULATION | ONE PHASE OF TWO PHASES OTHER THAN MINIMUM PHASE |
| 90~150 | V3 | UPPER SOLID TWO-PHASE MODULATION | ONE PHASE OF TWO PHASES OTHER THAN MAXIMUM PHASE |
| 150~210 | V4 | LOWER SOLID TWO-PHASE MODULATION | ONE PHASE OF TWO PHASES OTHER THAN MINIMUM PHASE |
| 210~270 | V5 | UPPER SOLID TWO-PHASE MODULATION | ONE PHASE OF TWO PHASES OTHER THAN MAXIMUM PHASE |
| 270~330 | V6 | LOWER SOLID TWO-PHASE MODULATION | ONE PHASE OF TWO PHASES OTHER THAN MINIMUM PHASE |
| 330~30 | V1 | UPPER SOLID TWO-PHASE MODULATION | ONE PHASE OF TWO PHASES OTHER THAN MAXIMUM PHASE |

FIG. 12

| θi[deg] | VOLTAGE VECTOR CLOSEST IN PHASE TO CURRENT VECTOR | VOLTAGE MODULATION METHOD | CARRIER WAVE INVERTED PHASE |
|---|---|---|---|
| 30~60 | V2 | LOWER SOLID TWO-PHASE MODULATION | ONE PHASE OF TWO PHASES OTHER THAN MINIMUM PHASE |
| 60~90 | | | REMAINING ONE PHASE |
| 90~120 | V3 | UPPER SOLID TWO-PHASE MODULATION | ONE PHASE OF TWO PHASES OTHER THAN MAXIMUM PHASE |
| 120~150 | | | REMAINING ONE PHASE |
| 150~180 | V4 | LOWER SOLID TWO-PHASE MODULATION | ONE PHASE OF TWO PHASES OTHER THAN MINIMUM PHASE |
| 180~210 | | | REMAINING ONE PHASE |
| 210~240 | V5 | UPPER SOLID TWO-PHASE MODULATION | ONE PHASE OF TWO PHASES OTHER THAN MAXIMUM PHASE |
| 240~270 | | | REMAINING ONE PHASE |
| 270~300 | V6 | LOWER SOLID TWO-PHASE MODULATION | ONE PHASE OF TWO PHASES OTHER THAN MINIMUM PHASE |
| 300~330 | | | REMAINING ONE PHASE |
| 330~0 | V1 | UPPER SOLID TWO-PHASE MODULATION | ONE PHASE OF TWO PHASES OTHER THAN MAXIMUM PHASE |
| 0~30 | | | REMAINING ONE PHASE |

POWER CONVERSION DEVICE AND ELECTRIC POWER STEERING DEVICE

CROSS REFERENCE TO RELATED APPLICATIONS

This application is a National Stage of International Application No. PCT/JP2017/029824, filed Aug. 21, 2017.

TECHNICAL FIELD

The present invention relates to a power conversion device configured to reduce a capacitor current, and to an electric power steering device including the power conversion device.

BACKGROUND ART

As an example of a related-art inverter device, there is given an inverter device configured as described below (see, for example, Patent Literature 1). Specifically, the inverter device includes an inverter including a plurality of switching elements provided so as to correspond to respective phases of three phases, and a control unit configured to apply two-phase modulation control to switching on and off of the respective switching elements of the inverter.

When a power factor of a load is equal to or higher than a threshold value set in advance, the control unit executes a phase shift of shifting a center position of an ON period or a center position of an OFF period by 180 degrees in two phases other than a stop phase in the two-phase modulation control. Moreover, when the power factor of the load is smaller than the threshold value, the control unit executes the two-phase modulation control without executing the phase shift.

CITATION LIST

Patent Literature

[PTL 1] WO 2014/097804 A1

SUMMARY OF INVENTION

Technical Problem

With the control method (hereinafter referred to as "related-art control method") described in Patent Literature 1, when the power factor decreases, and the two-phase modulation control is executed without executing the phase shift, there cannot be provided an effect of reducing a capacitor current of a capacitor configured to smooth a DC voltage input to an input side of the inverter.

Moreover, when a motor is connected to an output side of the inverter, and the rotation speed of the motor increases from zero, the power factor generally decreases. Thus, in the related-art method, when the rotation speed of the motor is zero or the motor is rotating in a low-speed region, the phase shift is executed, thereby being able to provide the effect of reducing the capacitor current. Meanwhile, when the motor is rotating at high speed, the phase shift is stopped, ant the effect of reducing the capacitor current cannot be provided.

The present invention has been made in view of the above-mentioned problems, and therefore has an object to provide a power conversion device contributing to reduction of a capacitor current even when the number of rotations of a motor is high and a power factor is low, and an electric power steering device including the power conversion device.

Solution to Problem

According to one embodiment of the present invention, there is provided a power conversion device including: an inverter, which includes a plurality of semiconductor switching elements, and is configured to invert a DC voltage output from a DC power supply into three-phase AC voltages by the respective semiconductor switching elements being switched on and off, to output the three-phase AC voltages; a capacitor provided in parallel between the DC power supply and the inverter; and a controller configured to calculate voltage command values, which are command values for the three-phase AC voltages to be output from the inverter, based on an input control command value, and output on/off signals for switching on and off the respective semiconductor switching elements of the inverter in accordance with the calculated voltage command values, wherein the controller is configured to output the on/off signals so that, out of a plurality of voltage vectors defined so as to correspond to patterns of the on/off signals, the second closest voltage vector and the third closest voltage vector in phase to a current vector that is based on currents supplied as a result of output of the three-phase AC voltages are formed.

Advantageous Effects of Invention

According to the present invention, it is possible to provide the power conversion device capable of contributing to the reduction of the capacitor current even when the number of rotations of the motor is high and the power factor is low, and the electric power steering device including the power conversion device.

BRIEF DESCRIPTION OF DRAWINGS

FIG. 2 is a table for showing voltage vectors to be output so as to correspond to a phase θi of a current vector in the first embodiment of the present invention.

FIG. 3 is a table for showing voltage vectors to be output so as to correspond to patterns of on/off signals Qup to Qwn in the first embodiment of the present invention.

FIG. 6 is a table for showing duties of the voltage vectors to be output so as to correspond to the phase θi of the current vector in the first embodiment of the present invention.

FIG. 10 is a table for showing voltage modulation methods to be employed so as to correspond to the phase θi of the current vector in a second embodiment of the present invention.

FIG. 12 is a table for showing voltage modulation methods to be employed so as to correspond to the phase θi of the current vector in a third embodiment of the present invention.

DESCRIPTION OF EMBODIMENTS

Now, a power conversion device and an electric power steering device according to preferred embodiments of the present invention are described with reference to the accompanying drawings. In the illustration of the drawings, the same components or corresponding components are denoted by the same reference symbols, and the overlapping description thereof is herein omitted.

First Embodiment

Figure 1:
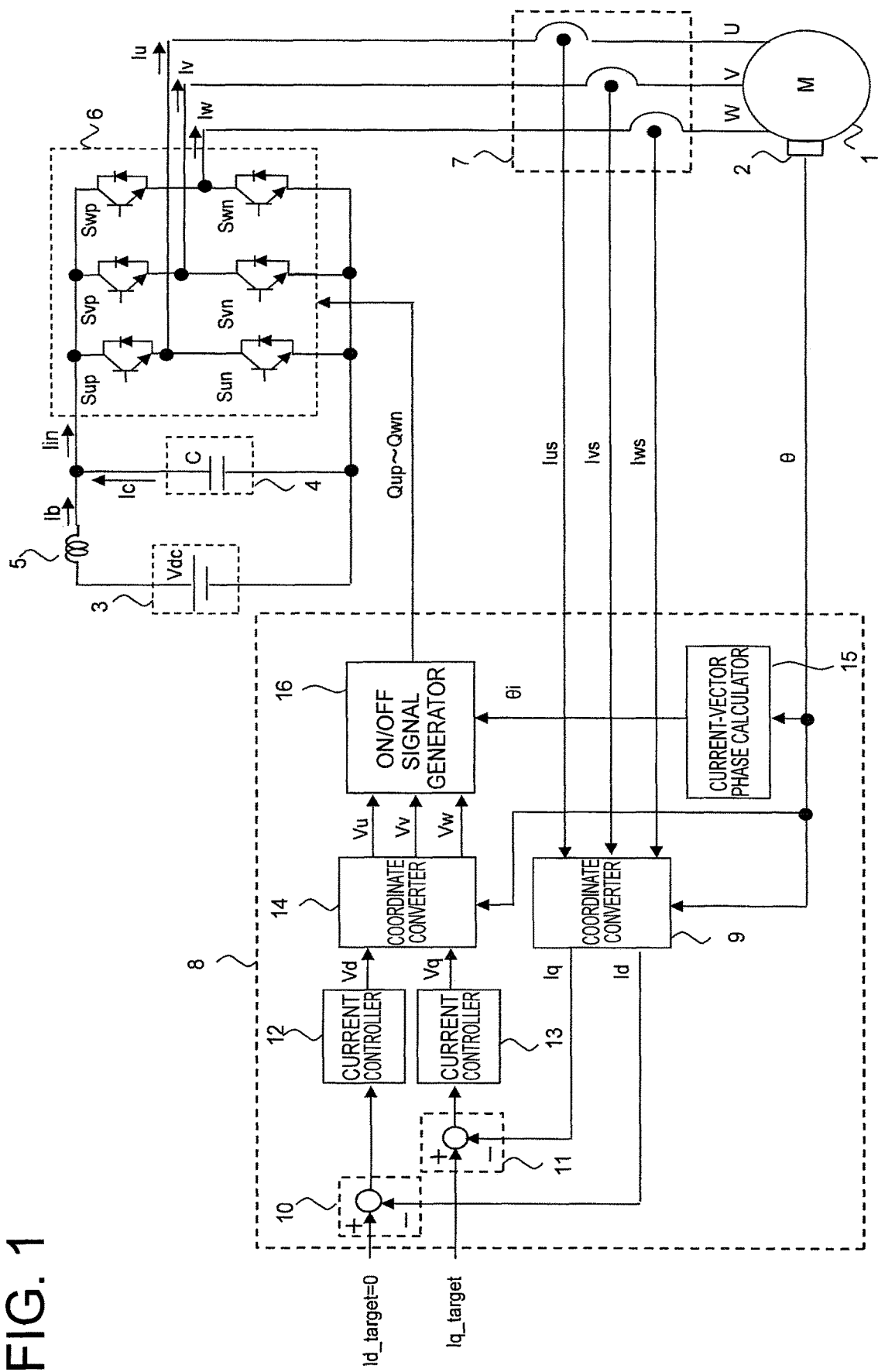
FIG. 1 is a diagram for illustrating an overall configuration of a power conversion device according to a first embodiment of the present invention.

FIG. 1 is a diagram for illustrating an overall configuration of a power conversion device according to a first embodiment of the present invention. In FIG. 1, a DC power supply 3 and a motor 1 are also illustrated. The DC power supply 3 is connected to an input side of the power conversion device. The motor 1 is connected to an output side of the power conversion device.

As illustrated in FIG. 1, the power conversion device according to the first embodiment includes a capacitor 4, an inverter 6, a current detector 7, and a controller 8.

The motor 1 is a three-phase AC motor having three-phase windings constructed by a winding U in a U phase, a winding V in a V phase, and a winding W in a W phase. Specific examples of the motor 1 include a permanent-magnet synchronous motor, an induction motor, and a synchronous reluctance motor, but any type of motor may be used as the motor 1 as long as the motor has three-phase windings. A case in which a permanent-magnet synchronous motor of non-salient type is used as the motor 1 is exemplified herein.

A position detector 2 is configured to detect a rotation position θ of the motor 1 to output the detected rotation position θ to the controller 8.

The DC power supply 3 includes a high electric potential-side terminal and a low electric potential-side terminal, and is configured to output a DC voltage Vdc to the inverter 6 as a voltage between both of the terminals. The DC power supply 3 includes any devices configured to output a DC voltage, such as a battery, a DC-DC converter, a diode rectifier, and a PWM rectifier.

The capacitor 4 is provided in parallel between the DC power supply 3 and the inverter 6 so as to correspond to the inverter 6. The capacitor 4 is connected in parallel with the DC power supply 3, and is configured to suppress fluctuation of the DC voltage Vdc input to the inverter 6, to thereby achieve a stable DC voltage.

An inductance 5 represents an inductance value contained inside the DC power supply 3 and in an intermediate cable. A common mode choke coil is connected as a noise filter to a vicinity of the DC power supply 3 so as to suppress noise flowing out from the inverter 6 to the DC power supply 3 in the power conversion device. An inductance value of such a noise filter is also contained in the inductance 5.

The inverter 6 includes a plurality of semiconductor switching elements, and is configured to invert the DC voltage Vdc output from the DC power supply 3 into three-phase AC voltages through switching on/off of the respective semiconductor switching elements, to output the three-phase AC voltages.

The inverter 6 is a three-phase inverter including three semiconductor switching elements Sup to Swp on a high electric potential side and three semiconductor switching elements Sun to Swn on a low electric potential side. The semiconductor switching elements Sup to Swp and the semiconductor switching elements Sun to Swn are switched on/off based on on/off signals Qup to Qwn output from the controller 8. As a result, the inverter 6 inverts the DC voltage Vdc input from the DC power supply 3 into the AC voltages. The inverter 6 applies the AC voltages after the conversion to the winding U, the winding V, and the winding W of the motor 1, to thereby supply a current Iu, a current Iv, and a current Iw to the winding U, the winding V, and the winding W, respectively.

The on/off signals Qup, Qun, Qvp, Qvn, Qwp, and Qwn are the switching signals for switching on and off the semiconductor switching elements Sup, Sun, Svp, Svn, Swp, and Swn, respectively. In the following, when the value of each of the on/off signals Qup to Qwn is 1, a signal for turning on a semiconductor switching element corresponding to the on/off signal is output. When the value of the signal is 0, a signal for tuning off the semiconductor element corresponding to the on/off signal is output.

As each of the semiconductor switching elements Sup to Swn, a semiconductor switching device, for example, an IGBT, a bipolar transistor, or a MOS power transistor and a diode connected to each other in antiparallel are used.

The current detector 7 is configured to detect values of the current Iu, the current Iv, and the current Iw flowing through the winding U, the winding V, and the winding W of the motor 1 as current detection values Ius, Ivs, and Iws, respectively.

The current detector 7 maybe a current detector of such a type that a current detection resistor is provided in series with each of the semiconductor switching elements Sun, Svn, and Swn of the inverter 6, to thereby detect each of the current detection values Ius, Ivs, and Iws. Moreover, the current detector 7 may be a current detector of such a type that a current detection resistor is provided between the inverter 6 and the capacitor 4, to thereby detect an inverter input current Iin, and obtain the current detection values Ius, Ivs, and Iws from this detection value.

Current command values Id_target and Iq_target set as control command values for the motor 1 are input to the controller 8. A case in which the current command value Id_target is set to 0 is herein exemplified. The controller 8 is configured to output the on/off signals Qup to Qwn based on the input current command values Id_target and Iq_target, the rotation position θ input from the position detector 2, and the current detection values Ius, Ivs, and Iws input from the current detector 7.

A case in which the command values for the currents supplied to the motor 1 are set as the control command values for the motor 1 is exemplified, but the control command values are not limited thereto. For example, when the V/F control is applied to the motor 1, the control command value is a speed command value for the motor 1. When a rotation position of the motor 1 is controlled, the control command value is a position command value for the motor 1. Moreover, the case in which the controller 8 determines the on/off signals Qup to Qwn based on the current detection values Ius, Ivs, and Iws input from the current detector 7 is exemplified, but the configuration is not limited to this case. For example, the controller 8 may be configured to determine the on/off signals Qup to Qwn from the current command values Id_target and Iq_target in a feedforward manner.

A description is now given of respective elements constructing the controller 8. The controller 8 includes a coordinate converter 9, a subtractor 10, a subtractor 11, a current controller 12, a current controller 13, a coordinate converter 14, a current-vector phase calculator 15, and an on/off signal generator 16. The controller 8 is implemented by, for example, a microcomputer, a read only memory (ROM), and a random access memory (RAM). The microcomputer is configured to execute arithmetic processing. The ROM is configured to store data such as program data and fixed value data. The RAM is configured so that stored data can be updated, and successively rewritten.

The coordinate converter 9 is configured to calculate currents Id and Iq on rotating two axes based on the current detection values Ius, Ivs, and Iws input from the current detector 7 and the rotation position θ input from the position detector 2, output the current Id to the subtractor 10, and to output the current Iq to the subtractor 11.

The subtractor 10 is configured to subtract the current Id on the rotating two axes from the current command value Id_target, and to output a result of the subtraction to the current controller 12.

The subtractor 11 is configured to subtract the current Iq on the rotating two axes from the current command value Iq_target, and to output a result of the subtraction to the current controller 13.

The current controller 12 is configured to apply proportional and integral control to the output value of the subtractor 10 so that the output value is zero, to thereby calculate a voltage Vd on the rotating two axes, and to output the voltage Vd to the coordinate converter 14.

The current controller 13 is configured to apply proportional and integral control to the output value of the subtractor 11 so that the output value is zero, to thereby calculate a voltage Vq on the rotating two axes, and to output the voltage Vq to the coordinate converter 14.

The coordinate converter 14 is configured to calculate command values Vu, Vv, and Vw based on the voltages Vd and Vq on the rotating two axes, and the rotation position e input from the position detector 2, and to output a result of the calculation to the on/off signal generator 16.

The current-vector phase calculator 15 is configured to calculate the phase θi of the current vector based on the rotation position θ input from the position detector 2 as given by Expression (1-1). In this case, a reference axis of the phase θi is the U phase (see FIG. 5).

$$\theta i = \theta + 90 \text{ (deg)} \tag{1-1}$$

Expression (1-1) holds true when a permanent-magnet synchronous motor of non-salient type is used as the motor 1. When a permanent-magnet synchronous motor of salient type or an induction motor is used as the motor 1, the current-vector phase calculator 15 is only required to calculate the phase θi as given by Expression (1-2).

$$\theta i = \theta + \mathrm{atan}(Iq/Id) \text{ (deg)} \tag{1-2}$$

Further, the current-vector phase calculator 15 may use not the rotation position θ of the motor 1, but the current detection values Ius, Ivs, and Iws, to thereby calculate the phase θi as given by Expression (1-3).

$$\theta i = \mathrm{atan}\{(0.866 \times Ivs - 0.866 \times Iws)/(Ius - 0.5 \times Ivs - 0.5 \times Iws)\} \text{(deg)} \tag{1-3}$$

Moreover, the current-vector phase calculator 15 may use three-phase current command values obtained by applying coordinate conversion to the current command values Id_target and Iq_target in place of the current detection values Ius, Ivs, and Iws, to thereby calculate the phase θi as given by Expression (1-3).

The on/off signal generator 16 is configured to output the on/off signals Qup to Qwn based on the voltage command values Vu, Vv, and Vw and the phase θi of the current vector.

A detailed description is now given of an operation of the on/off signal generator 16. FIG. 2 is a table for showing voltage vectors to be output so as to correspond to the phase θi of the current vector in the first embodiment of the present invention.

As shown in FIG. 2, the on/off signal generator 16 selects and outputs two types of voltage vectors so as to correspond to the phase θi of the current vector. For example, when the phase θi is equal to or larger than 30 degrees, and smaller than 90 degrees, two types of voltage vectors V1 and V3 are selected. When the phase θi is equal to or larger than 90 degrees, and smaller than 150 degrees, two types of voltage vectors V2 and V4 are selected. As shown in FIG. 2, similarly, the on/off signal generator 16 selects two types of voltage vectors so as to correspond to the phase θi.

It should be understood that the range of the phase θi of the current vector shown in FIG. 2 may be determined so as to correspond to a relationship in sign among the current detection values Ius, Ivs, and Iws. For example, when there is such a relationship in sign that Ius>0, Ivs>0, and Iws<0, the range of the phase θi can be determined so as to be 30<θi<90. This is apparent also from FIG. 7 described later.

Figure 4:
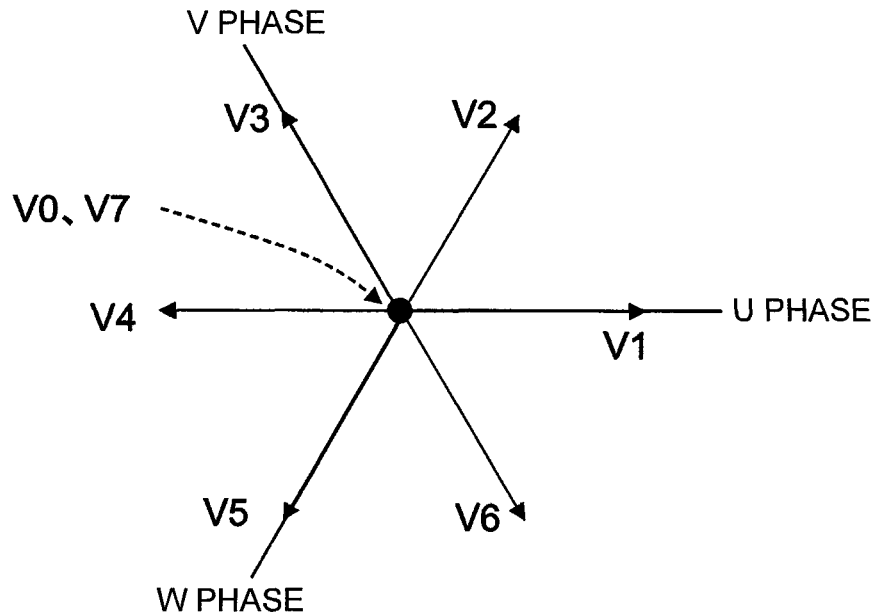
FIG. 4 is a diagram for illustrating voltage vectors V0 to V7 of FIG. 3.

A description is now given of the voltage vectors. FIG. 3 is a table for showing voltage vectors to be output so as to correspond to patterns of the on/off signals Qup to Qwn in the first embodiment of the present invention. FIG. 4 is a diagram for illustrating the voltage vectors V0 to V7 of FIG. 3.

As shown in FIG. 3, the voltage vector is a voltage vector determined so as to correspond to the pattern of the on/off signals Qup to Qwn. The voltage vectors V0 to V7 of FIG. 3 are illustrated as in FIG. 4. As illustrated in FIG. 4, the voltage vectors V1 to V6 are effective voltage vectors having magnitudes arranged at every phase difference of 60 degrees. The voltage vectors V0 and V7 are zero-voltage vectors without a magnitude.

Figure 5:
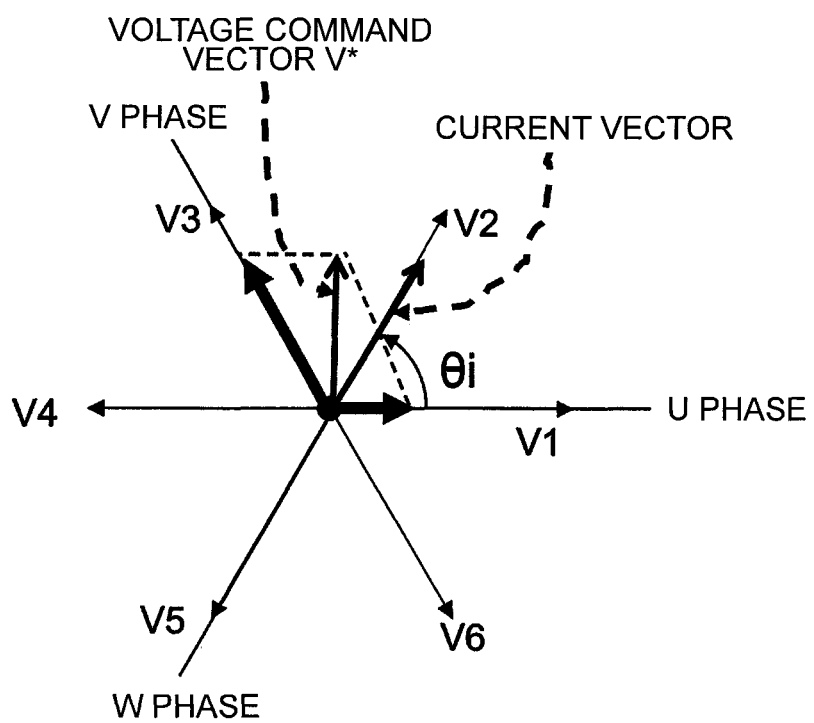
FIG. 5 is a diagram for illustrating voltage vectors to be output when the phase θi of the current vector is equal to or larger than 30 degrees and smaller than 90 degrees in the first embodiment of the present invention.

A description of the operation of the on/off signal generator 16 is continuously given. FIG. 5 is a diagram for illustrating the voltage vectors to be output when the phase θi of the current vector is equal to or larger than 30 degrees and smaller than 90 degrees in the first embodiment of the present invention.

When the phase θi of the current vector is equal to or larger than 30 degrees and smaller than 90 degrees, the voltage vector closest in phase to the current vector is the voltage vector V2 as illustrated in FIG. 5. In this case, the output voltage vectors are the second closest voltage vector V1 and the third closest voltage vector V3 in phase to the current vector.

Output periods of the voltage vectors V1 and V3 are adjusted so that a resultant vector formed by the voltages V1 and V3 matches the voltage command vector V*. In this case, the voltage command vector V* is calculated through use of the voltage command values Vu, Vv, and Vw as given by Expression (1-4).

$$V^* = 0.8166 \times (Vu + a \times Vv + a^2 \times Vw) \quad (1\text{-}4)$$

In Expression (1-4), $a = \exp(j \times 120)$ and $j^2 = -1$.

The on/off signal generator 16 thus calculates the voltage command vector V* as given by Expression (1-4). The on/off signal generator 16 adjusts the magnitudes of the voltage vectors V1 and V3 so that the resultant vector of those voltage vectors matches the voltage command vector V*.

As a specific example, duty values for the respective voltage vectors to be output so as to correspond to the phase θi of the current vector are shown in FIG. 6. FIG. 6 is a table for showing the duties of the voltage vectors to be output so as to correspond to the phase θi of the current vector in the first embodiment of the present invention.

In FIG. 6, $V_\alpha$ and $V_\beta$ are voltages obtained by expressing the voltage command values Vu, Vv, and Vw on stationary two axes. An α axis matches the U-phase axis. A β axis is advanced in phase by 90 degrees with respect to the α axis. $D_1$, $D_2$, $D_3$, $D_4$, $D_5$, and $D_6$ are output duties corresponding to the voltage vectors V1, V2, V3, V4, V5, and V6, respectively.

For example, when a control cycle is Ts, and the phase θi of the current vector is equal to or larger than 30 degrees, and is smaller than 90 degrees, the respective output periods of the voltage vectors are only required to be set to $D_1 \times Ts$ for the voltage V1, $D_3 \times Ts$ for the voltage V3, and $(1-D_1-D_3) \times Ts$ for the zero voltage vector, namely, the voltage vector V0 or V7. The same applies to the cases in which the conditions of the phase θi are different.

As described above, the controller 8 calculates the voltage command values Vu to Vw, which are the command values of the three-phase AC voltages output from the inverter 6, based on the input control command value. The controller 8 outputs the on/off signals Qup to Qwn for switching on and off the respective semiconductor switching elements Sup to Swn of the inverter 6 in accordance with the calculated voltage command values Vu to Vw.

Moreover, the controller 8 outputs the on/off signals Qup to Qwn so that, out of the plurality of voltage vectors V0 to V7 defined so as to correspond to the patterns of the on/off signals Qup to Qwn, the second closest voltage vector and the third closest voltage vector in phase to the current vector that is based on the currents supplied as a result of the output of the three-phase AC voltages are formed.

A description is now given of an effect achieved as a result of selecting and outputting the second closest voltage vector and the third closest voltage vector in phase to the current vector.

First, a description is given of a relationship between the respective voltage vectors and the inverter input current Iin input to the inverter 6. In FIG. 3 described above, the inverter input current Iin corresponds to the voltage vector shown in the 7th column, and is shown in the 8th column. As shown in FIG. 3, when each of the zero voltage vectors V0 and V7 is output, the inverter input current Iin is 0. Moreover, when each of the effective voltage vectors V1 to V6 is output, the inverter input current Iin is equal to one current value out of the currents Iu, Iv, and Iw, or a value obtained by inverting the sign of this current.

Figure 7:
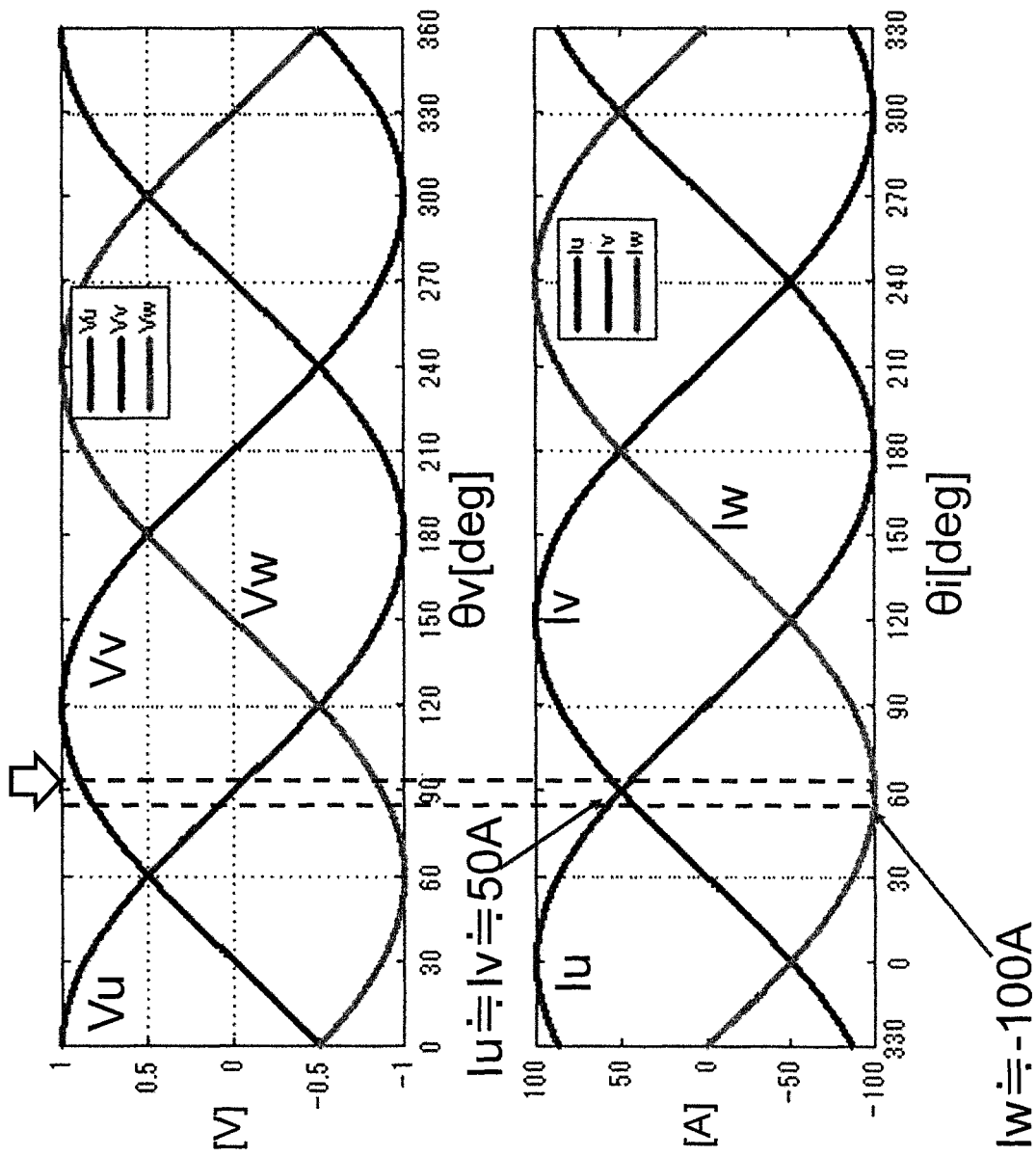
FIG. 7 is graphs for showing waveforms of voltage command values Vu, Vv, and Vw, and currents Iu, Iv, and Iw in the first embodiment of the present invention.

FIG. 7 is graphs for showing waveforms of the voltage command values Vu, Vv, and Vw, and the currents Iu, Iv, and Iw in the first embodiment of the present invention. In FIG. 7, there are shown waveforms exhibited when the amplitudes of the currents Iu, Iv, and Iw are 100 A, and the amplitudes of the voltage command values Vu, Vv, and Vw are 1 V. The currents Iu, Iv, and Iw in the bottom graph have a phase lag of 30 degrees with respect to the voltage command values Vu, Vv, and Vw in the top graph, respectively. A power-factor angle is thus 30 degrees, which corresponds to $\cos(30) \approx 0.8666$ in power factor value.

As illustrated in FIG. 5, when the phase θi of the current vector is approximately 60 degrees, the currents Iu, Iv, and Iw are approximately 50 A, 50 A, and −100 A, respectively, as shown in the frame of the broken lines in the bottom graph of FIG. 7.

Figure 8:
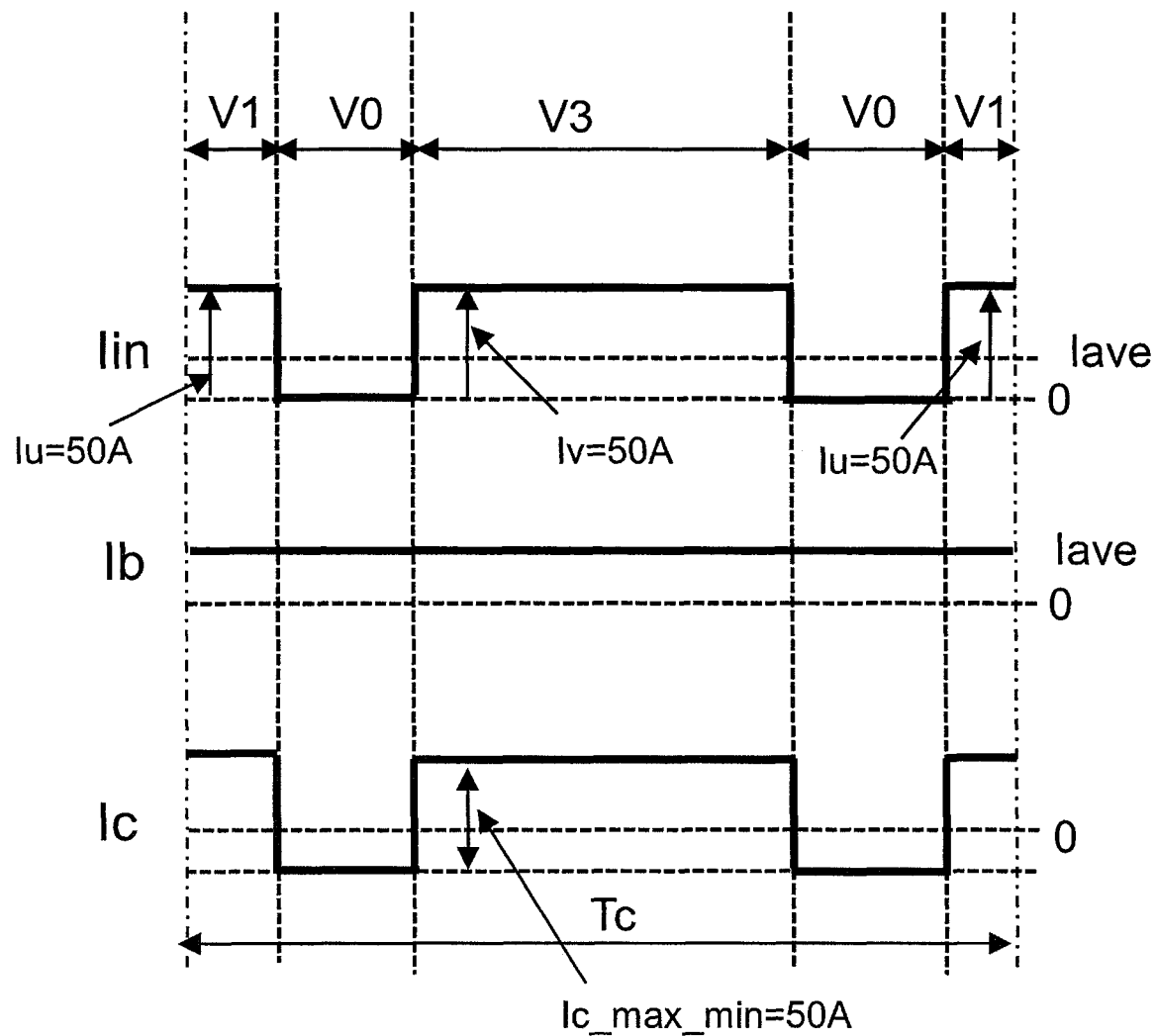
FIG. 8 is a graph for showing a waveform of a capacitor current Ic exhibited when the phase θi of the current vector is equal to or larger than 30 degrees and smaller than 90 degrees in the first embodiment of the present invention.

When the phase θi of the current vector is approximately 60 degrees in this case, the voltage vectors V1 and V3 are output as shown in FIG. 2. FIG. 8 is a graph for showing a waveform of a capacitor current Ic exhibited when the phase θi of the current vector is equal to or larger than 30 degrees and smaller than 90 degrees in the first embodiment of the present invention. In FIG. 8, waveforms of the inverter input current Iin and the DC current Ib are also shown.

As shown in FIG. 8, the controller 8 switches and outputs, for example, the voltage vectors V1, V0, V3, V0, and V1 including the zero voltage vector V0 in the stated order in the control cycle Tc. In this case, the inverter input current Iin changes in an order of Iu, 0, Iv, 0, and Iu as the voltage vectors change.

The inverter input current Iin is the current to be input to the inverter 6 as illustrated in FIG. 1, and is a synthetic current of the DC current Ib and the capacitor current Ic. As illustrated in FIG. 1, a path passing through the DC power supply 3 and a path passing through the capacitor 4 are in parallel with each other as viewed from the inverter 6.

The inductance 5 exists on the DC power supply 3 side, and hence the impedance on the DC power supply 3 side is indicated as ωL, where ω represents an angular frequency and L represents an inductance value. The impedance value is proportional to $\omega$, and hence the impedance value is low for a low frequency component, and high for a high frequency component.

The inductance on the capacitor 4 side is indicated as $1/\omega C$, where $\omega$ represents the angular frequency and C represents a capacitance value. The impedance value is inversely proportional to $\omega$, and hence the impedance value is low for a high frequency component, and high for a low frequency component.

From the description given above, the low frequency component of the inverter input current Iin corresponds to the DC current Ib, and the high frequency component thereof corresponds to the capacitor current Ic. Thus, as shown in FIG. 8, an average value Iave of the inverter input current Iin corresponds to the DC current Ib, and a fluctuation component of the inverter input current Iin excluding the average value Iave corresponds to the capacitor current Ic. Therefore, as shown in FIG. 8, the maximum value Ic_max_min of the fluctuation of the capacitor current Ic is 50 A.

Figure 9:
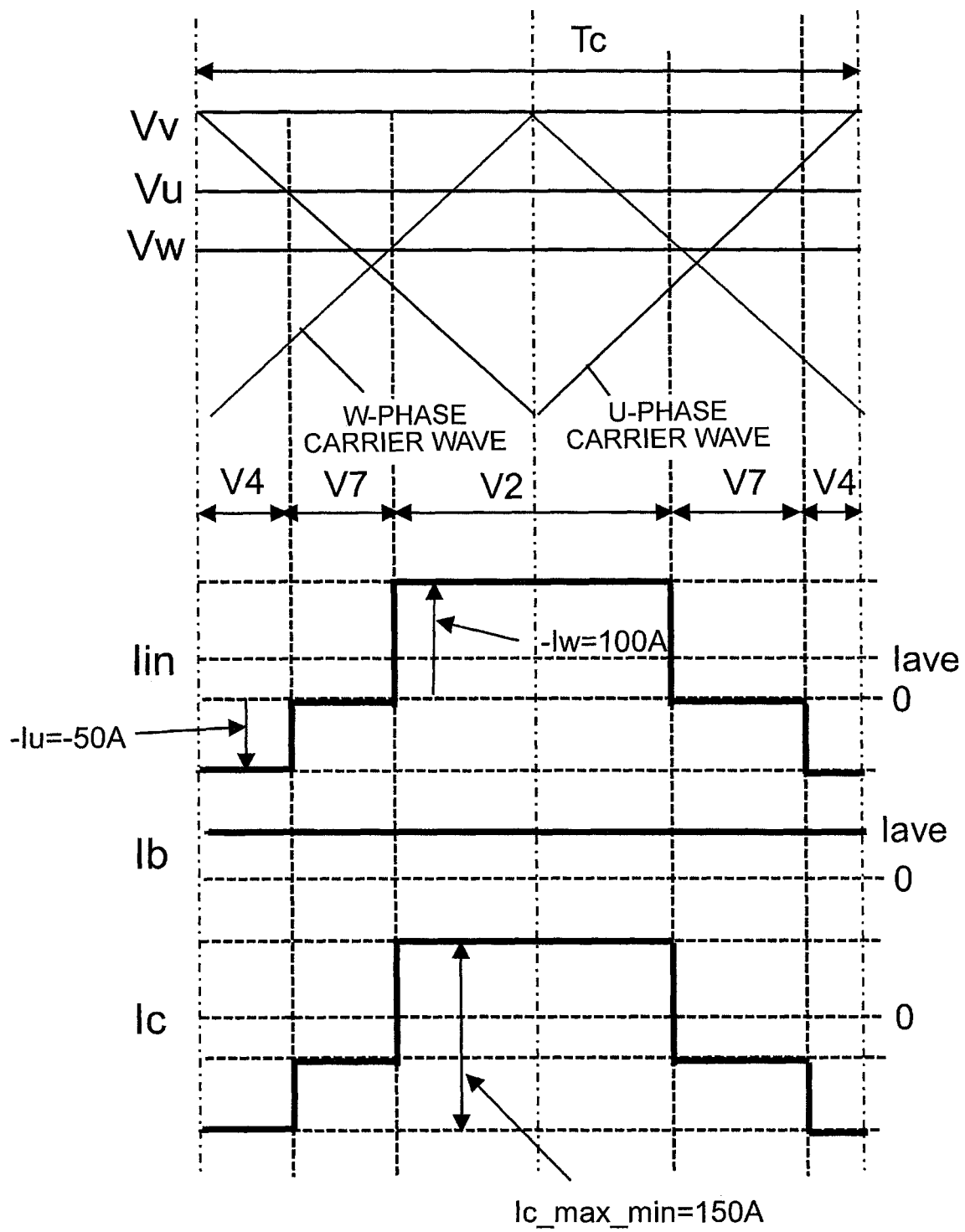
FIG. 9 is a diagram for illustrating a comparative example of FIG. 8.

A description is now given of a change in capacitor current Ic exhibited when a related-art control method described in Patent Literature 1 is applied in the region of the frame of the broken lines of FIG. 7 as a comparative example. FIG. 9 is a graph for showing the comparative example of FIG. 8. In FIG. 9, waveforms of the inverter input current Iin, the DC current Ib, and the voltage command values Vu to Vw are also shown.

With the related-art control method, a condition in which the power factor is 0.866 as shown in FIG. 7 is a condition under which a phase shift is executed as can be understood from FIG. 3 disclosed in Patent Literature 1. Moreover, the "two-phase modulation method" is used in the related-art control method, and when the power factor is equal to or higher than a threshold value, a PWM carrier wave is inverted in one phase other than a phase in which switching is stopped in accordance with the "two-phase modulation method". This state is equivalent to a state in which the PWM carrier waves are inverted to each other in the two phases other than the one phase in which the switching is stopped.

Thus, in FIG. 9, a case in which the PWM carrier waves are inverted to each other in the two phases other than the V phase in which the switching is stopped is shown. In the control method shown in FIG. 9, the voltage vectors are output in an order of V4, V7, V2, V7, and V4 in the control cycle Tc. In this case, the inverter input current Iin changes in an order of −Iu, 0, −Iw, 0, and −Iu as the voltage vectors change. Therefore, as shown in FIG. 9, the maximum value Ic_max_min of the fluctuation of the capacitor current Ic is 150 A.

In this way, compared with the related-art control method, in the control method according to the first embodiment, on/off signals are output so that, out of the voltage vectors V0 to V7, the second closest voltage vector and the third closest voltage vector in phase to the current vector that is based on the currents supplied to the motor 1 are formed. With such a configuration, there is provided such an unprecedented remarkable effect that the capacitor current can be reduced independently of the power factor.

As described above, the power conversion device according to the first embodiment is configured to output the on/off signals so that, out of the plurality of voltage vectors defined so as to correspond to the patterns of the on/off signals, the second closest voltage vector and the third closest voltage vector in phase to the current vector that is based on the currents supplied as a result of the output of the three-phase AC voltages from the inverter are formed.

Consequently, even when the number of rotations of the motor is high, and the power factor is low, the capacitor current can be reduced, and, as a result, the power conversion device can contribute to downsizing of the capacitor.

Second Embodiment

In a second embodiment of the present invention, a description is given of a power conversion device including the controller 8 having a configuration different from that in the first embodiment. In the second embodiment, a description is omitted for the same points as those of the first embodiment, and is mainly given of points different from the first embodiment.

As the difference from the configuration of the first embodiment, an operation of the on/off signal generator 16 is different in the power conversion device according to the second embodiment.

FIG. 10 is a table for showing a voltage modulation method to be employed so as to correspond to the phase $\theta i$ of the current vector in the second embodiment of the present invention.

The voltage vector closest in phase to the current vector is shown in the second column of FIG. 10 so as to correspond to the range of the phase $\theta i$ of the current vector shown in the first column. A voltage modulation method to be employed so as to correspond to the range of the phase $\theta i$ of the current vector shown in the first column is shown in the third column of FIG. 10.

A "lower solid two-phase modulation" as used herein refers to a modulation method of equally shifting the voltage command values Vu, Vv, and Vw so that the smallest voltage command value out of the voltage command values Vu, Vv, and Vw matches the minimum value of the carrier wave. A section in which this modulation method is employed is defined as "lower solid two-phase modulation section".

Meanwhile, an "upper solid two-phase modulation" as used herein refers to a modulation method of equally shifting the voltage command values Vu, Vv, and Vw so that the largest voltage command value out of the voltage command values Vu, Vv, and Vw matches the maximum value of the carrier wave. A section in which this modulation method is employed is defined as "upper solid two-phase modulation section".

As shown in FIG. 10, the "lower solid two-phase modulation" is employed as the voltage modulation method when the voltage vectors closest in phase to the current vector are V2, V4, and V6. As can be found from FIG. 3, as a common point, the voltage vectors V2, V4, and V6 are voltage vectors formed by turning on the two semiconductor switching elements on the high electric potential side, and turning on the one semiconductor switching element on the low electric potential side.

Thus, in the second embodiment, when the voltage vector closest in phase to the current vector is the voltage vector formed by turning on the two semiconductor switching elements on the high electric potential side, and turning on the one semiconductor switching element on the low electric potential side, the "lower solid two-phase modulation" is employed as the voltage modulation method.

Meanwhile, as shown in FIG. 10, the "upper solid two-phase modulation" is employed as the voltage modulation method when the voltage vectors closest in phase to the current vector are V1, V3, and V5. As can be found from FIG. 3, as a common point, the voltage vectors V1, V3, and V5 are voltage vectors formed by turning on one semiconductor switching element on the high electric potential side, and turning on the two semiconductor switching elements on the low electric potential side.

Thus, in the second embodiment, when the voltage vector closest in phase to the current vector is the voltage vector formed by turning on one semiconductor switching element on the high electric potential side, and turning on the two semiconductor switching elements on the low electric potential side, the "upper solid two-phase modulation" is employed as the voltage modulation method.

A "carrier wave inverted phase" shown in the fourth column of FIG. 10 means a phase in which a corresponding carrier wave is inverted with respect to a carrier wave corresponding to the other phase about the center of this carrier wave as a reference.

When the "lower solid two-phase modulation" is employed as the voltage modulation method, the carrier wave inverted phase is one phase out of the remaining two phases other than the minimum phase in which the voltage command value is the minimum out of the three phases. That is, the carrier wave corresponding to the one phase, which is the carrier wave inverted phase, is inverted with respect to the carrier wave corresponding to the other phase about the center of this carrier wave as the reference in the remaining two phases other than the minimum phase.

Meanwhile, when the "upper solid two-phase modulation" is employed as the voltage modulation method, the carrier wave inverted phase is one phase out of the remaining two phases other than the maximum phase in which the voltage command value is the maximum out of the three phases. That is, the carrier wave corresponding to the one phase, which is the carrier wave inverted phase, is inverted with respect to the carrier wave corresponding to the other phase about the center of this carrier wave as the reference in the remaining two phases other than the maximum phase.

As described above, the controller 8 is configured to compare the carrier waves and the voltage command values Vu to Vw with each other, to thereby output the on/off signals Qup to Qwn. When the controller 8 employs the "lower solid two-phase modulation", one phase is set as the carrier wave inverted phase, and the carrier wave in the carrier wave inverted phase is inverted about the center value as the reference with respect to the carrier wave in the other phase in the remaining two phases other than the minimum phase out of the three phases. Moreover, when the controller 8 employs the "upper solid two-phase modulation", one phase is set as the carrier wave inverted phase, and the carrier wave in the carrier wave inverted phase is inverted about the center value as the reference with respect to the carrier wave in the other phase in the remaining two phases other than the maximum phase out of the three phases.

A further description is now given of the operation of the controller 8 while giving a specific example. For example, consideration is given to the case in which the phase θi of the current vector is as shown in FIG. 5, and the waveforms of the voltage command values Vu, Vv, and Vw and the currents Iu, Iv, and Iw are as shown in FIG. 7.

Figure 11:
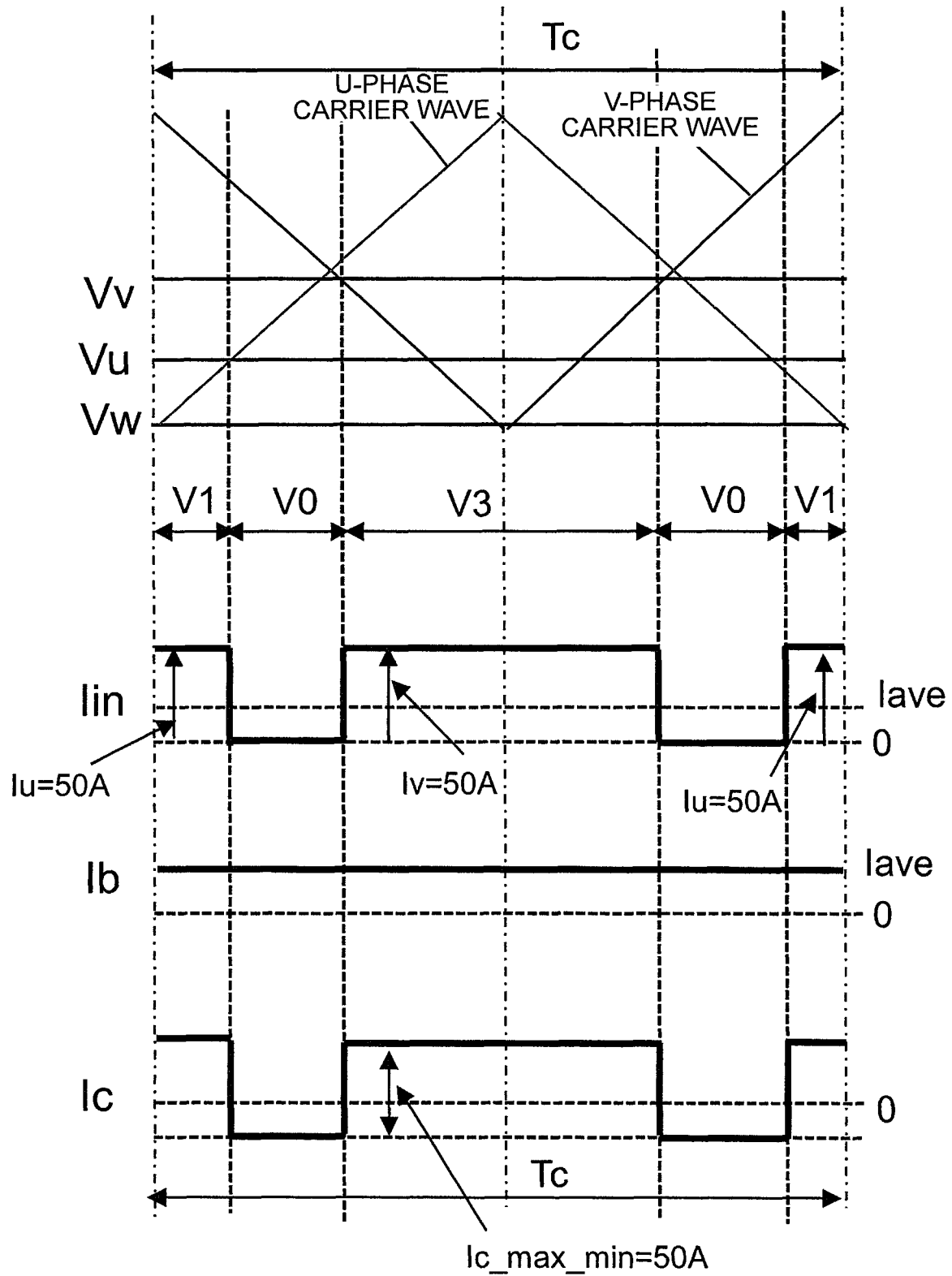
FIG. 11 is a graph for showing the waveform of the capacitor current Ic exhibited when the phase θi of the current vector is equal to or larger than 30 degrees and smaller than 90 degrees in the second embodiment of the present invention.

FIG. 11 is a graph for showing a waveform of the capacitor current Ic exhibited when the phase θi of the current vector is equal to or larger than 30 degrees and smaller than 90 degrees in the second embodiment of the present invention. In FIG. 11, waveforms of the voltage command values Vu, Vv, and Vw, the inverter input current Iin, and the DC current Ib are also shown.

In this case, the phase θi of the current vector is approximately 60 degrees, and hence the "lower solid two-phase modulation" is employed as the voltage modulation method as can be understood from FIG. 10. Thus, the carrier wave inverted phase is any one of the U phase and the V phase other than the W phase, which is the minimum phase in which the voltage command value is the minimum, out of the three phases. That is, as shown in FIG. 10, the U-phase carrier wave corresponding to the U phase is inverted with respect to the V-phase carrier wave corresponding to the V phase about the center of the V-phase carrier wave as the reference.

Moreover, as shown in FIG. 11, the maximum value Ic_max_min of the fluctuation of the capacitor current Ic is 50 A. Thus, the control method in the second embodiment provides the same effect as that of the control method in the first embodiment.

The power conversion device according to the second embodiment is configured to set one phase out of the remaining two phases other than the minimum phase as the carrier wave inverted phase when the "lower solid two-phase modulation" is employed, and set one phase out of the remaining two phases other than the maximum phase as the carrier wave inverted phase when the "upper solid two-phase modulation" is employed. Even with this configuration, the same effect as that of the first embodiment is provided.

Third Embodiment

In a third embodiment of the present invention, a description is given of a power conversion device including the controller 8 having a configuration different from those in the first and second embodiments. In the third embodiment, a description is omitted for the same points as those of the first and second embodiments, and is mainly given of points different from the first and second embodiments.

As the difference from the configuration of the second embodiment, the power conversion device is configured as described below in the third embodiment. Specifically, the operation of the on/off signal generator 16 is different. Moreover, a sawtooth wave is employed as the carrier wave.

FIG. 12 is a table for showing a voltage modulation method to be employed so as to correspond to the phase θi of the current vector in the third embodiment of the present invention. The voltage modulation method shown in the third column of FIG. 12 is employed so as to correspond to the range of the phase θi of the current vector shown in the first column as in FIG. 10.

Moreover, the carrier wave inverted phase shown in the fourth column of FIG. 12 is switched from one phase out of the two phases other than the minimum phase to the remaining one phase at the center of the range of the phase θi corresponding to the "lower solid two-phase modulation section". Similarly, the carrier wave inverted phase is switched from one phase out of the two phases other than the maximum phase to the remaining one phase at the center of the range of the phase θi corresponding to the "upper solid two-phase modulation section". In such a manner, the carrier wave inverted phase is switched each time the phase θi of the current vector changes by 30 degrees.

As described above, the controller 8 switches the carrier wave inverted phase from one phase to the other phase at the center of the "lower solid two-phase modulation section", in which the "lower solid two-phase modulation" is employed. Moreover, the controller 8 switches the carrier wave inverted phase from one phase to the other phase at the center of the "upper solid two-phase modulation section", in which the "upper solid two-phase modulation" is employed.

A further description is now given of the operation of the controller 8 while giving a specific example. For example, consideration is given to the case in which the phase θi of the current vector is as shown in FIG. 5, and the waveforms of the voltage command values Vu, Vv, and Vw and the currents Iu, Iv, and Iw are as shown in FIG. 7.

Figure 13:
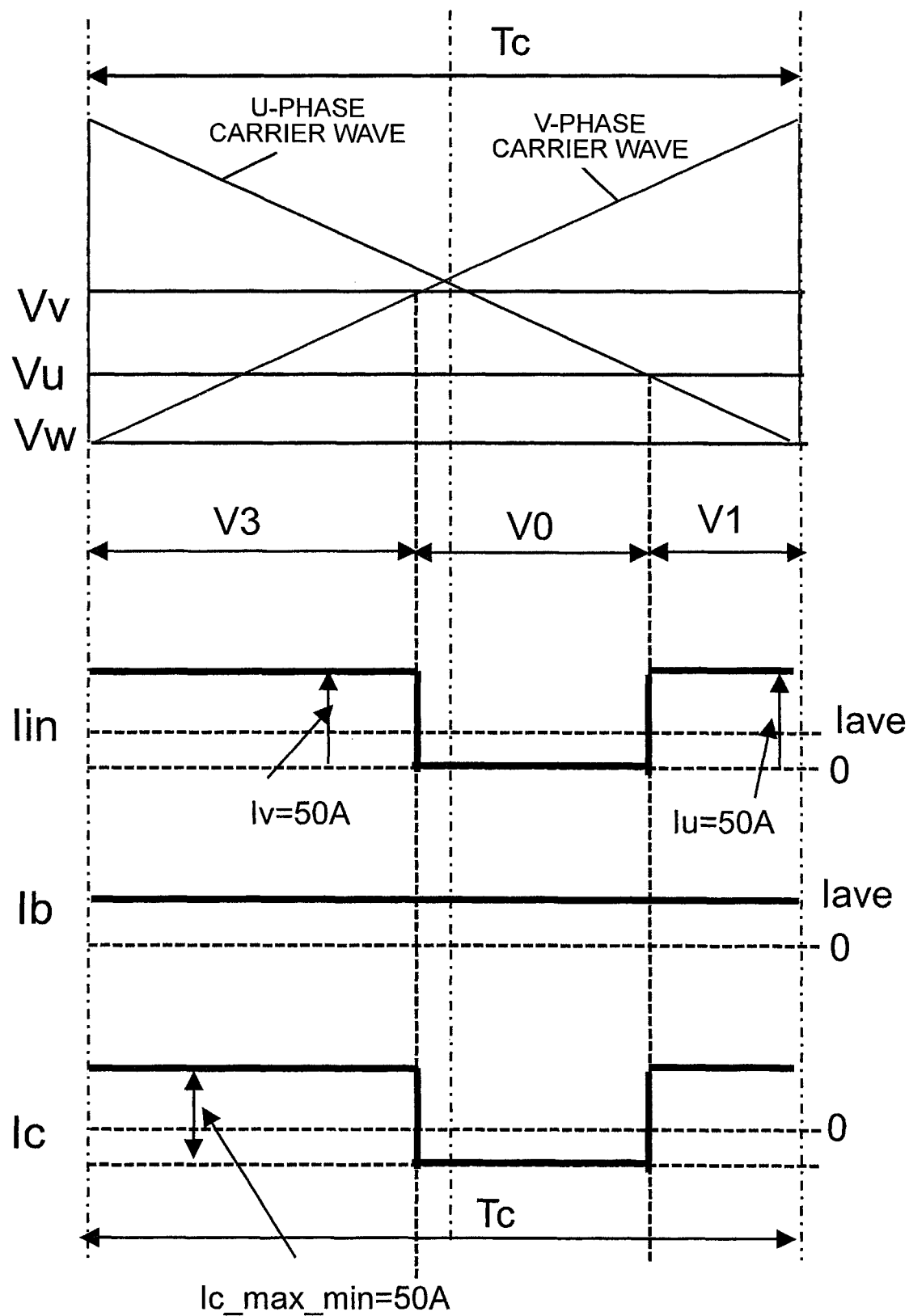
FIG. 13 is a graph for showing a waveform of the capacitor current Ic exhibited when the phase θi of the current vector is slightly smaller than 60 degrees in the third embodiment of the present invention.
Figure 14:
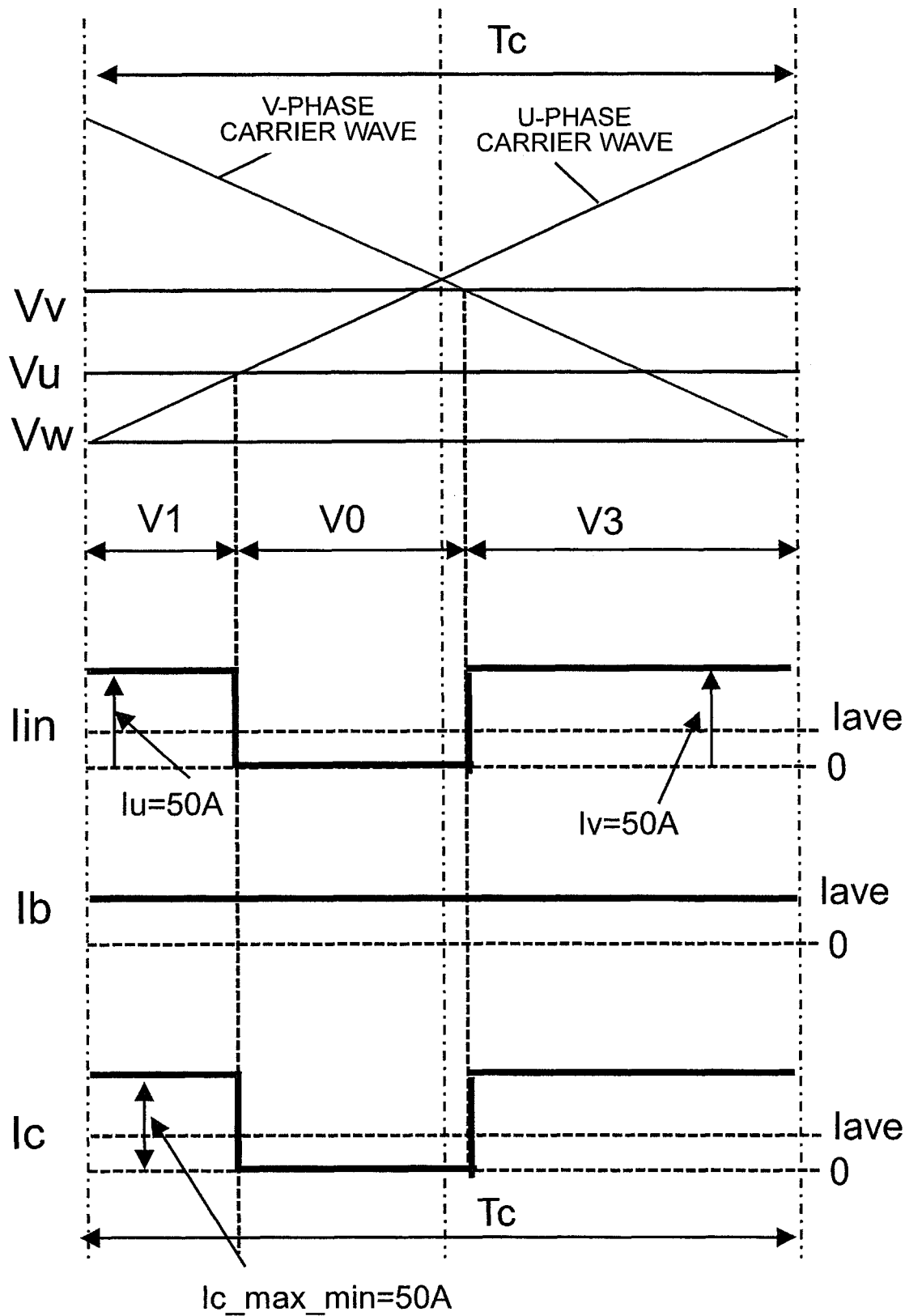
FIG. 14 is a graph for showing the waveform of the capacitor current Ic exhibited when the phase θi of the current vector is slightly larger than 60 degrees in the third embodiment of the present invention.

FIG. 13 is a graph for showing a waveform of the capacitor current Ic exhibited when the phase θi of the current vector is slightly smaller than 60 degrees in the third embodiment of the present invention. FIG. 14 is a graph for showing a waveform of the capacitor current Ic exhibited when the phase θi of the current vector is slightly larger than 60 degrees in the third embodiment of the present invention.

In FIG. 13 and FIG. 14, waveforms of the voltage command values Vu, Vv, and Vw, the inverter input current Iin, and the DC current Ib are also shown.

When the phase θi of the current vector is in the range equal to or larger than 30 degrees and smaller than 60 degrees, the "lower solid two-phase modulation" is employed as the voltage modulation method, and the sawtooth wave is further employed as the carrier wave, as can be understood from FIG. 12.

Moreover, the carrier wave inverted phase is any one of the U phase and the V phase other than the W phase, which is the minimum phase in which the voltage command value is the minimum, out of the three phases. That is, as shown in FIG. 13, the U-phase carrier wave, which is a sawtooth wave decreasing rightward is inverted with respect to the V-phase carrier wave, which is a sawtooth wave increasing rightward, about the center of the V-phase carrier wave as the reference.

Moreover, as shown in FIG. 13, the second closest voltage vector V1 and the third closest voltage vector V3 in phase are output to the current vector in the control cycle Tc. That is, in the control cycle Tc, the voltage vectors are output while being switched in an order of, for example, V3, V0, and V1 including the zero voltage vector V0. In this case, the maximum value Ic_max_min of the fluctuation of the capacitor current Ic is 50 A.

Meanwhile, when the phase θi of the current vector is in the range equal to or larger than 60 degrees and smaller than 90 degrees, the "lower solid two-phase modulation" is employed as the voltage modulation method, and the sawtooth wave is further employed as the carrier wave, as can be understood from FIG. 12.

Moreover, the carrier wave inverted phase is switched from the U phase, which is one phase out of the two phases other than the W phase, which is the minimum phase, to the V phase, which is the remaining one phase. That is, the V-phase carrier wave, which is a sawtooth wave decreasing rightward is inverted with respect to the U-phase carrier wave, which is a sawtooth wave increasing rightward, about the center of the U-phase carrier wave as the reference.

Moreover, as shown in FIG. 14, the second closest voltage vector V3 and the third closest voltage vector V1 in phase are output to the current vector in the control cycle Tc. That is, in the control cycle Tc, the voltage vectors are output while being switched in an order of, for example, V1, V0, and V3 including the zero voltage vector V0. In this case, the maximum value Ic_max_min of the fluctuation of the capacitor current Ic is 50 A.

As described above, the control method in the third embodiment provides the same effect as that of the control method in the second embodiment.

Figure 15:
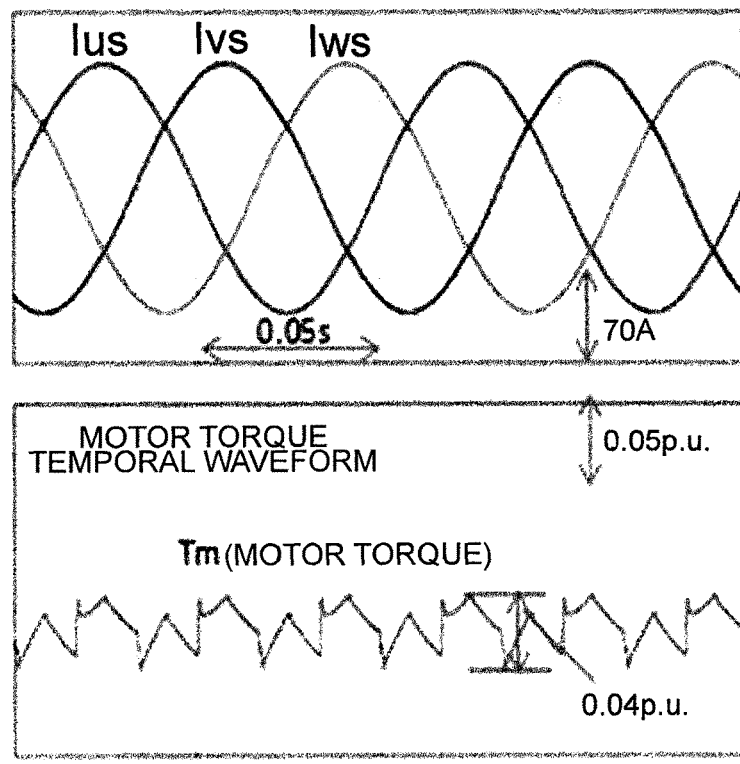
FIG. 15 is a graph for showing a waveform of a motor torque exhibited when a carrier wave inverted phase is switched each time the phase θi of the current vector changes by 30 degrees in the third embodiment of the present invention.
Figure 16:
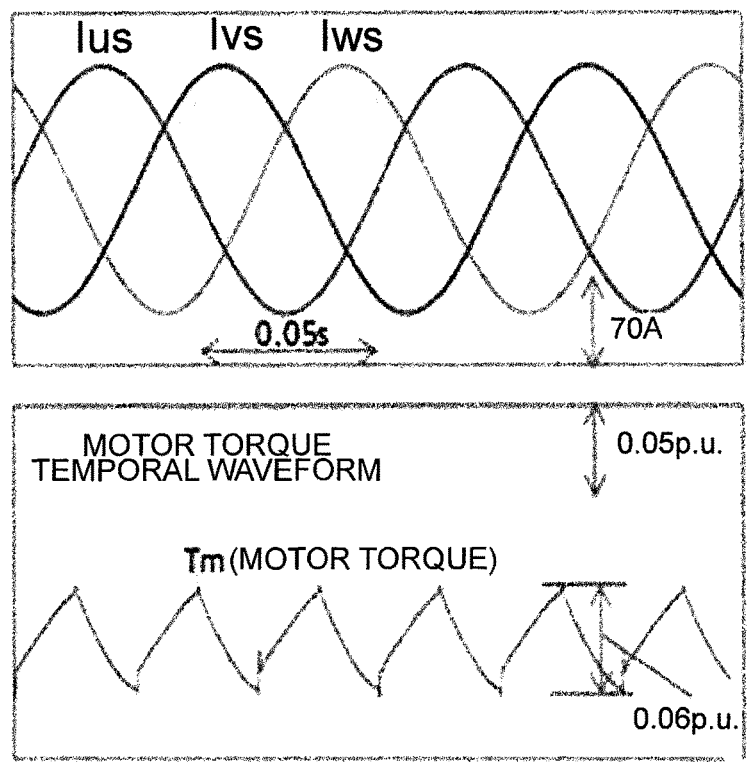
FIG. 16 is a graph for showing a comparative example of FIG. 15.

FIG. 15 is a graph for showing a waveform of a motor torque exhibited when the carrier wave inverted phase is switched each time the phase θi of the current vector changes by 30 degrees in the third embodiment of the present invention. FIG. 16 is a graph for showing a comparative example of FIG. 15.

In FIG. 16, there is shown a waveform of the motor torque exhibited when the carrier wave inverted phase is switched each time the phase θi of the current vector changes by 60 degrees as in the control method in the second embodiment as the comparative example. Moreover, in FIG. 15 and FIG. 16, waveforms of the current detection values Ius, Ivs, and Iws are also shown.

As shown in FIG. 15, when the carrier wave inverted phase switches each time the phase θi of the current vector changes by 30 degrees, pulsation of the motor torque is 0.04 p.u. Meanwhile, as shown in FIG. 16, when the carrier wave inverted phase switches each time the phase θi of the current vector changes by 60 degrees, pulsation of the motor torque is 0.06 p.u. Thus, the control method in the third embodiment provides an effect of suppressing ripple of the motor torque.

The power conversion device according to the third embodiment, compared with the configuration in the second embodiment, is configured so as to set the carrier waves as the sawtooth waves, switch the carrier wave inverted phase from one phase to the other phase at the center of the "lower solid two-phase modulation section", and switch the carrier wave inverted phase from one phase to the other phase at the center of the "upper solid two-phase modulation section". As a result, the same effect as that of the first embodiment is provided, and the ripple of the motor torque can be suppressed more.

Fourth Embodiment

In a fourth embodiment of the present invention, a description is given of a power conversion device including the controller 8 having a configuration different from those in the first to third embodiments. In the fourth embodiment, a description is omitted for the same points as those of the first to third embodiments, and is mainly given of points different from the first to third embodiments.

As the difference from the configuration of the second embodiment, the setting method for the carrier waves is different in the fourth embodiment. Specifically, in the fourth embodiment, the frequency of the carrier wave corresponding to a middle phase having the second largest voltage command value out of the three phases is set so as to be twice as high as the frequency of the carrier waves corresponding to the remaining two phases other than the middle phase.

As described above, the controller 8 is configured to compare the carrier waves and the voltage command values Vu to Vw with each other, to thereby output the on/off signals Qup to Qwn. Moreover, the controller 8 sets the frequency of the carrier wave in the middle phase having the second largest voltage command value out of the three phases so as to be twice as high as the frequency of the carrier waves in the remaining two phases other than the middle phase.

A further description is now given of the operation of the controller 8 while giving a specific example. For example, consideration is given to the case in which the phase θi of the current vector is as shown in FIG. 5, and the waveforms of the voltage command values Vu, Vv, and Vw and the currents Iu, Iv, and Iw are as shown in FIG. 7.

Figure 17:
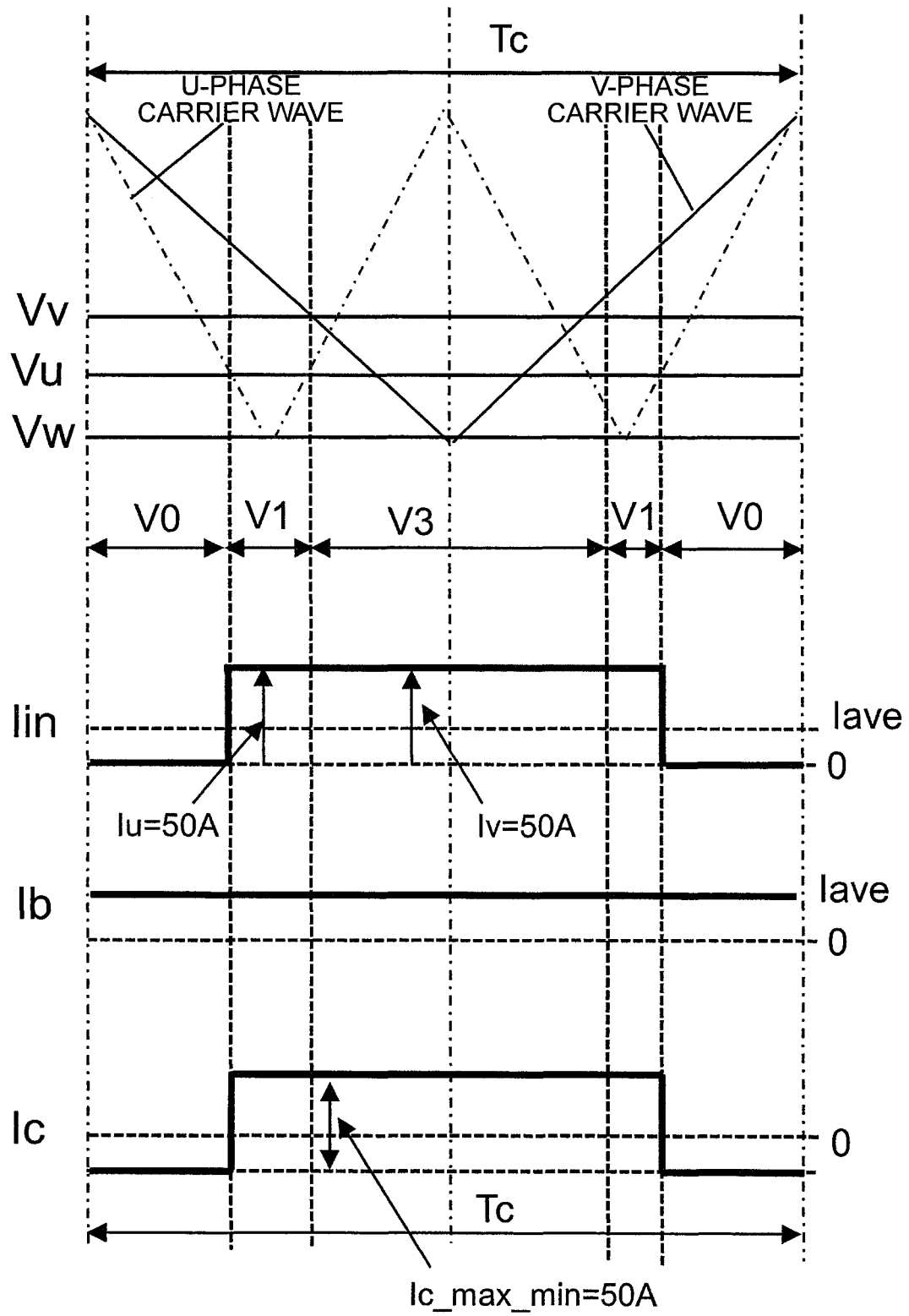
FIG. 17 is a graph for showing the waveform of the capacitor current Ic exhibited when the phase θi of the current vector is equal to or larger than 30 degrees and smaller than 90 degrees in a fourth embodiment of the present invention.

FIG. 17 is a graph for showing the waveform of the capacitor current Ic exhibited when the phase θi of the current vector is equal to or larger than 30 degrees and smaller than 90 degrees in the fourth embodiment of the present invention. In FIG. 17, waveforms of the voltage command values Vu, Vv, and Vw, the inverter input current Iin, and the DC current Ib are also shown.

In this case, a magnitude relationship among the voltage command values Vu, Vv, and Vw is given as Vv>Vu>Vw, and hence the middle phase is the U phase. Thus, the controller 8 sets the frequency of the U-phase carrier wave corresponding to the U phase so as to be twice as high as the frequency of the carrier waves corresponding to the remaining two phases.

Moreover, when the frequency of the U-phase carrier wave is set so as to be twice as high as the frequency of the carrier waves corresponding to the remaining two phases, the maximum value Ic_max_min of the fluctuation of the capacitor Ic is 50 A as shown in FIG. 17. Thus, the control method in the fourth embodiment provides the same effect as that of the control method in the first embodiment.

As described above, the power conversion device according to the fourth embodiment is configured so that the frequency of the carrier wave in the middle phase is twice as high as the frequency of the carrier waves in the remaining two phases other than the middle phase. Even with this configuration, the same effect as that of the first embodiment is provided.

Fifth Embodiment

In a fifth embodiment of the present invention, a description is given of a power conversion device including the controller 8 having a configuration different from those in the first to fourth embodiments. In the fifth embodiment, a description is omitted for the same points as those of the first to fourth embodiments, and is mainly given of points different from the first to fourth embodiments.

As the difference from the configuration of the second embodiment, the power conversion device is configured as described below in the fifth embodiment. Specifically, the controller 8 in the fifth embodiment is configured to set the phases of the carrier waves so as to be equal to each other, when the current command value Iq_target to current to be supplied to the motor 1 to which the three-phase AC voltages are to be applied is equal to or smaller than a threshold value set in advance.

Figure 18:
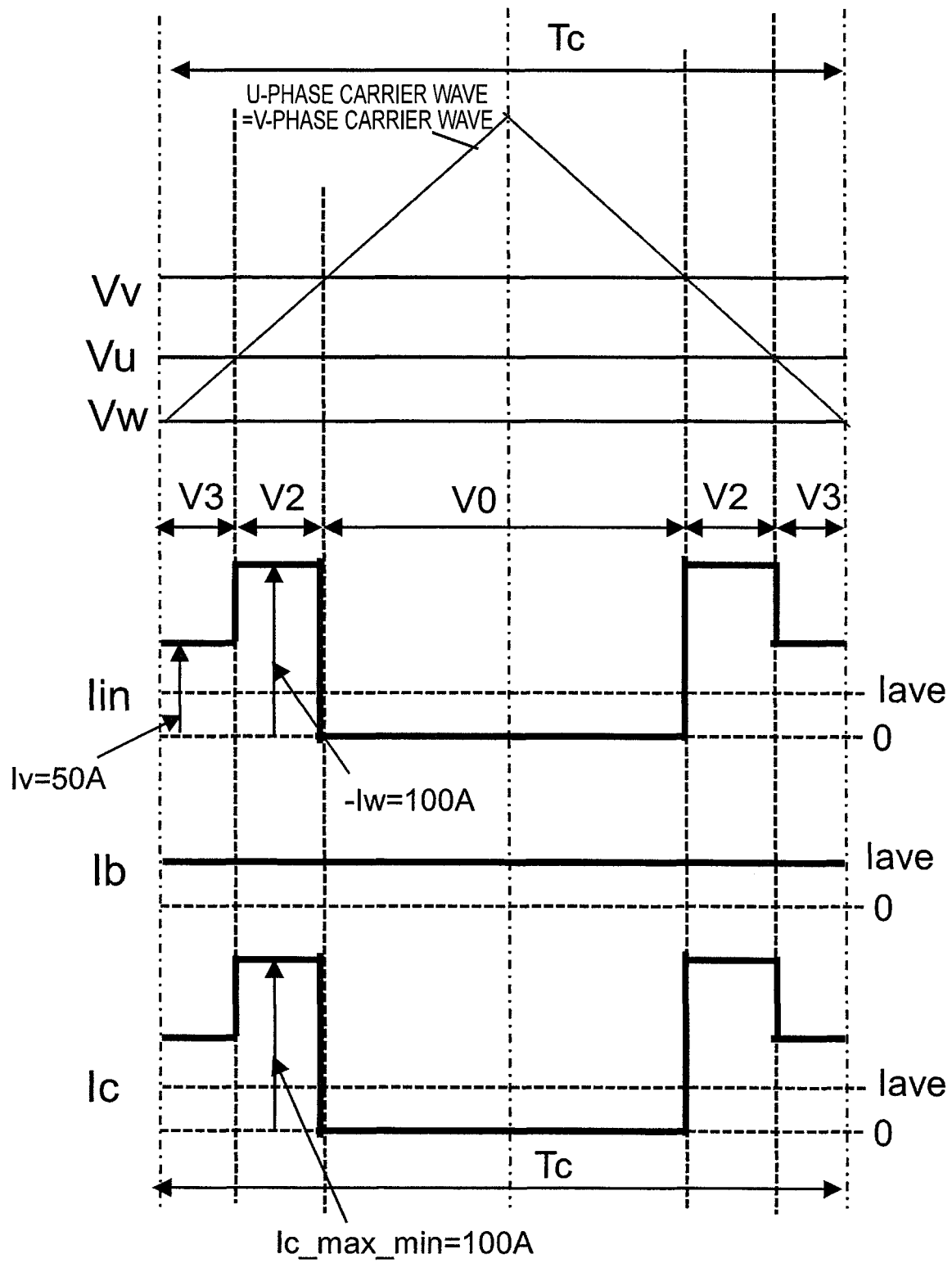
FIG. 18 is a graph for showing the waveform of the capacitor current Ic exhibited when the phases of a U-phase carrier wave and a V-phase carrier wave are set to be equal to each other as compared to FIG. 11.

FIG. 18 is a graph for showing the waveform of the capacitor current Ic exhibited when the phases of the U-phase carrier wave and the V-phase carrier wave are set to be equal to each other compared with FIG. 11. In FIG. 18, similarly to FIG. 11 described above, waveforms of the voltage command values Vu, Vv, and Vw, the inverter input current Iin, and the DC current Ib are also shown.

As shown in FIG. 18, the controller 8 switches and outputs, for example, the voltage vectors V3, V2, V0, V2, and V3 including the zero voltage vector V0 in the stated order in the control cycle Tc. As can be understood from FIG. 5, those voltage vectors V3 and V2 are the closest voltage vector and the second closest voltage vector in phase to the voltage command vector V*. Therefore, the phase difference between the output voltage vector and the voltage command vector V* is smaller than the phase difference in the case of FIG. 11, in which the carrier wave is inverted.

From the perspective of the suppression of the torque ripple of the motor 1, the configuration in which the carrier waves are in phase as shown in FIG. 18 is advantageous over the configuration in which the carrier wave is inverted as shown in FIG. 11. However, as shown in FIG. 18, the maximum value Ic_max_min of the fluctuation of the capacitor current Ic is 100 A. Therefore, from the perspective of the suppression of the capacitor current, the configuration in which the carrier waves are in phase as shown in FIG. 18 is disadvantageous compared with the configuration in which the carrier wave is inverted as shown in FIG. 11.

Thus, in the fifth embodiment, when the current command value Iq_target is equal to or smaller than the threshold value, and the fluctuation of the capacitor current IC is consequently within a permissible range, the controller 8 sets the carrier waves so as to be in phase as shown in FIG. 18. The torque ripple of the motor 1 is suppressed by such control.

Meanwhile, when the current command value Iq_target is larger than the threshold value, and the fluctuation of the capacitor current IC is consequently exceeds the permissible range, the controller 8 inverts the carrier wave as shown in FIG. 11 described above. The fluctuation of the capacitor current is suppressed by such control.

Figure 19:
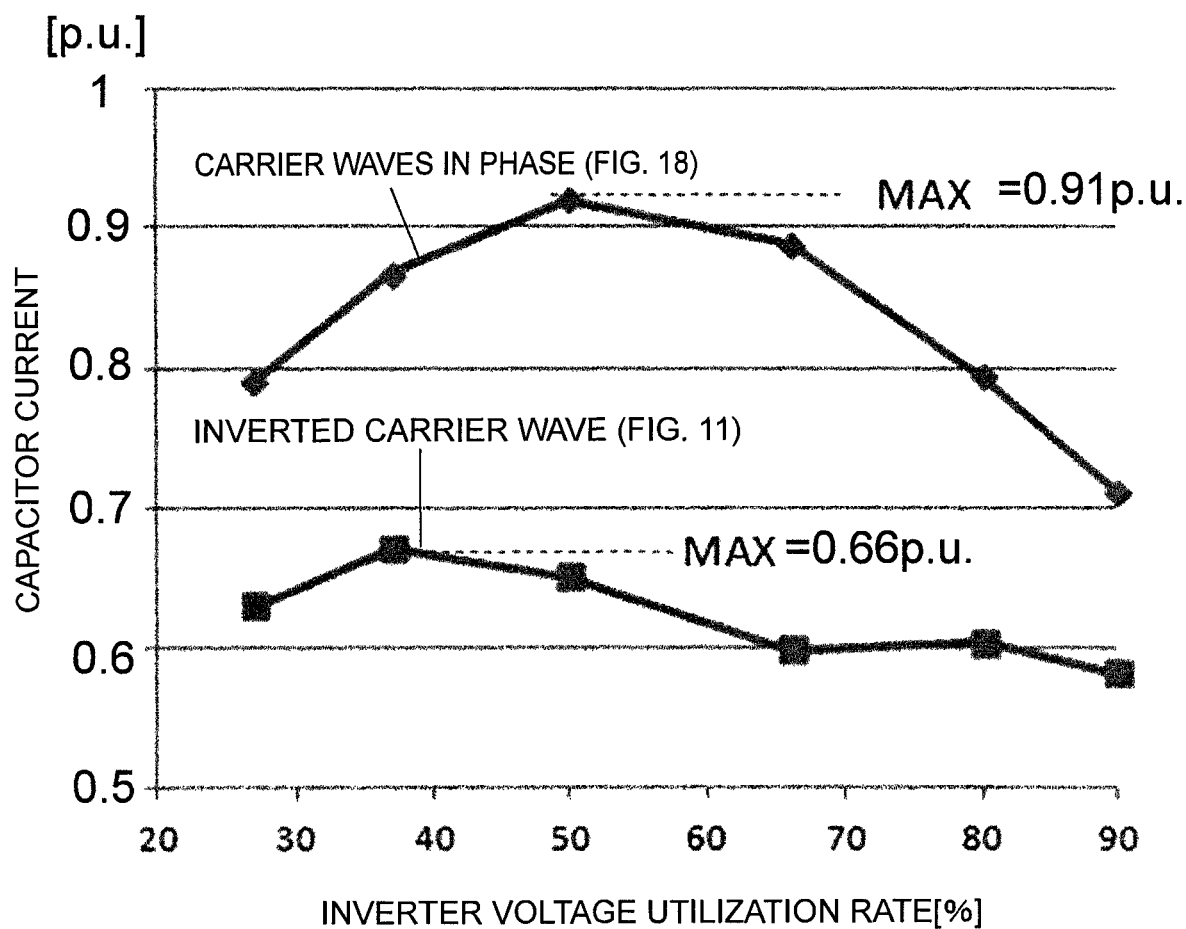
FIG. 19 is an explanatory graph for showing a relationship between an inverter voltage utilization rate and the capacitor current in a fifth embodiment of the present invention.

A description is now given of a specific example of the setting of the above-mentioned threshold value. FIG. 19 is an explanatory graph for showing a relationship between an inverter voltage utilization rate and the capacitor current in the fifth embodiment of the present invention.

In FIG. 19, there is shown a change in capacitor current (p.u.) with respect to the inverter voltage utilization rate (%) exhibited when a rated current is supplied to the motor 1, that is, the current command value Iq_target is set to the rated current. The inverter voltage utilization rate is given by "(line voltage amplitude)/Vdc×100".

In FIG. 19, respective changes in capacitor current (p.u.) with respect to the inverter utilization rate (%) are shown in the case in which the carrier waves are in phase as in FIG. 18 and in the case in which the carrier wave is inverted as in FIG. 11.

In the case in which the current command value Iq_target is set to the rated current value, the maximum value of the current flowing through the capacitor 4 when the carrier wave is inverted is set as a first maximum value, and the maximum value of the current flowing through the capacitor 4 when the carrier waves are in phase is set as a second maximum value.

In this case, as shown in FIG. 19, the first maximum value is 0.66 (p.u.), and the second maximum value is 0.91 (p.u.). Thus, when the carrier wave is inverted, the capacitor current can be reduced by approximately 30% compared with the case in which the carrier waves are in phase.

In consideration of such a fact that the maximum value of the capacitor current is proportional to the current command value Iq_target, as long as the current command value Iq_target is equal to or smaller than approximately 70% of the rated current value, even when the carrier waves are in phase, the maximum value of the capacitor current is equal to or smaller than 0.66 (p.u.).

Thus, the controller 8 operates as described below so that the maximum value of the capacitor current is always equal to or smaller than 0.66 (p.u.), and the torque ripple is suppressed as much as possible.

The controller 8 sets the carrier waves so as to be in phase when the current command value Iq_target is equal to or smaller than approximately 70% of the rated current value. That is, in this case, the controller 8 sets the carrier waves so as to be in phase in the remaining two phases other than the minimum phase in the lower solid two-phase modulation section in the control method in the second or third embodiment. Moreover, in this case, the controller 8 sets the carrier waves so as to be in phase in the remaining two phases other than the maximum phase in the upper solid two-phase modulation section in the control method in the second or third embodiment.

Meanwhile, when the current command value Iq_target is larger than approximately 70% of the rated current value, the controller 8 inverts the carrier wave in accordance with the control method in the second or third embodiment. The value that is approximately 70% of the rated current value corresponds to the above-mentioned threshold value.

In this manner, the above-mentioned threshold value is set based on the ratio of the first maximum value to the second maximum value and on the rated current value. That is, the ratio of the first maximum value in the case in which the carrier wave is inverted to the second maximum value in the case in which the carrier waves are in phase is obtained in advance.

When a ratio of the current command value Iq_target to the rated current value is equal to or smaller than the ratio, the controller 8 sets the carrier waves so as to be in phase. When the ratio of the current command value Iq_target to the rated current value is larger than the ratio, the controller 8 inverts the carrier wave. Thus, the control method in the fifth embodiment can provide both the effect of reducing the torque ripple in the region in which the current command value is low and the effect of reducing the capacitor current in the region in which the current command value is high.

Compared with the configurations in the second and the third embodiments, when the current command value is equal to or smaller than the threshold value set in advance, the power conversion device according to the fifth embodiment described above is configured to set the phases of the carrier waves so as to be in phase in the remaining two phases other than the minimum phase in the lower solid two-phase modulation section, and set the phases of the carrier waves so as to be in phase in the remaining two phases other than the maximum phase in the upper solid two-phase modulation section.

With this configuration, both the effect of reducing the torque ripple in the region in which the current command value is low and the effect of reducing the capacitor current in the region in which the current command value is high can be provided.

Compared with the configuration in the fourth embodiment, the controller 8 may be configured to set the frequency of the carrier wave in the middle phase so as to match the frequency of the carrier waves in the remaining two phases other than the middle phase when the current command value is equal to or smaller than the threshold value set in advance. The same effect is provided even in this configuration.

Sixth Embodiment

In a sixth embodiment of the present invention, a description is given of an electric power steering device including the power conversion device of any one of the first to fifth embodiments. In the sixth embodiment, a description is omitted for the same points as those of the first to fifth embodiments, and is mainly given of points different from those of the first to fifth embodiments.

Figure 20:
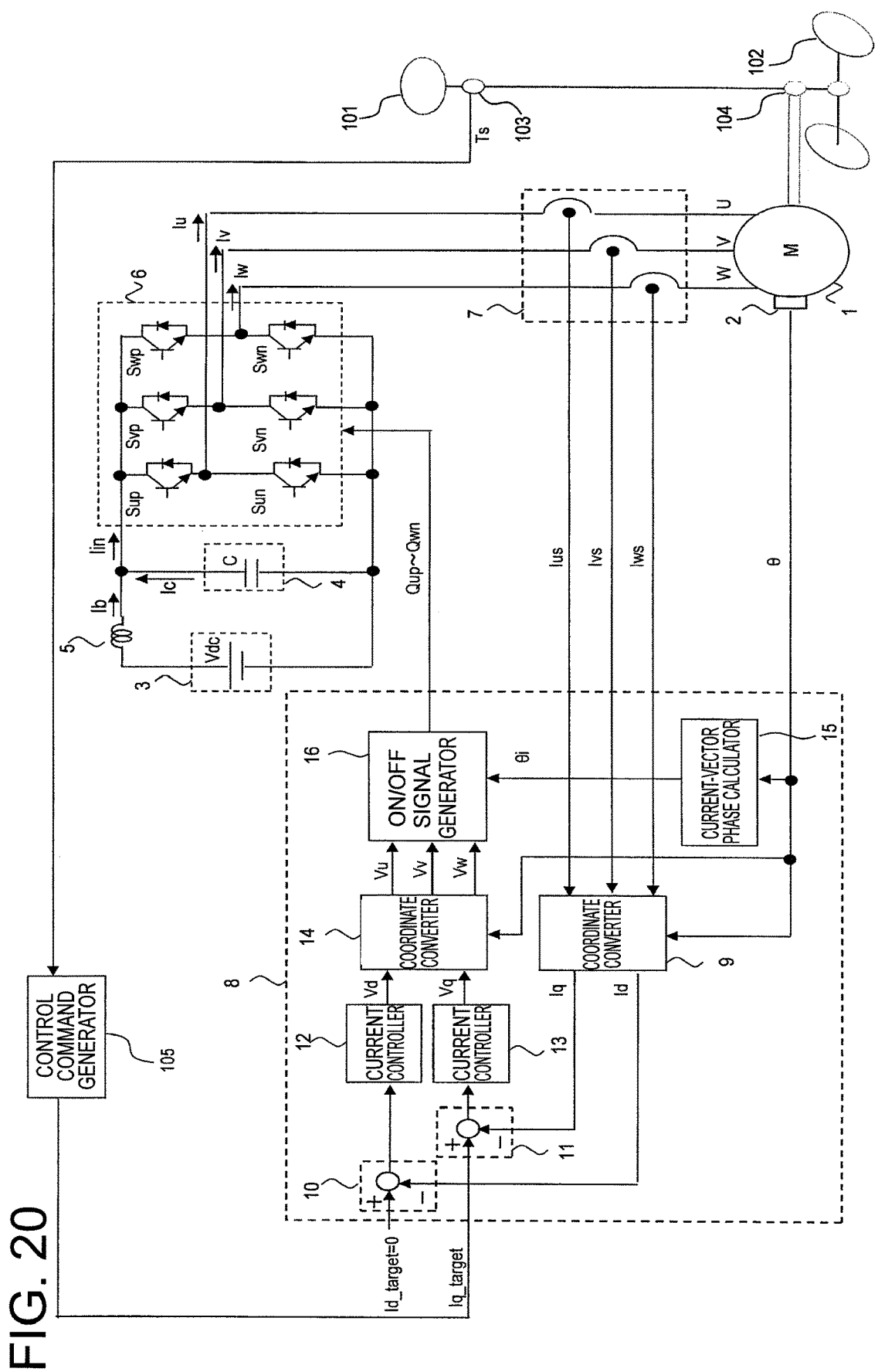
FIG. 20 is diagram for illustrating an overall configuration of an electric power steering device according to a sixth embodiment of the present invention.

FIG. 20 is diagram for illustrating an overall configuration of the electric power steering device according to the sixth embodiment of the present invention.

A driver of a vehicle in which the electric power steering device is mounted turns a steering wheel 101 leftward and rightward, to thereby steer front wheels 102. A torque detector 103 detects a steering torque Ts of a steering system, and output the detected steering torque Ts to a control command generator 105 described later. The motor 1 is configured to generate an assist torque for assisting steering by the driver through a gear 104. The motor 1 in the sixth embodiment has the same configuration as that of the motor 1 in the first embodiment except that the rotor is mechanically connected to the gear 104.

The control command generator 105 calculates a control command value for controlling the motor 1 so as to be in a desired state based on the steering torque Ts input from the torque detector 103 to output the calculated control command value. The control command generator 105 calculates the current command value Iq_target as a control command as given by, for example, Expression (6-1).

$$Iq\_target = ka \times Ts \quad (6\text{-}1)$$

In Expression (6-1), ka represents a constant, but the value of ka may be set so as to change to correspond to the steering torque Ts or a travel speed of the vehicle. The current command value Iq_target is determined as given by Expression (6-1) in this case, but the current command value Iq_target may be determined based on publicly-known compensation control corresponding to the steering state.

A description is now given of effects provided by the electric power steering device according to the sixth embodiment.

Downsizing is required in the electric power steering device. The downsizing of the electric power steering device increases ease of mounting to a vehicle, increases a degree of freedom of arrangement, and also contributes to downsizing of the vehicle itself.

Downsizing of passive elements such as capacitors and coils forming the inverter provided in the electric power steering device is directly linked to downsizing of the inverter. In particular, a ratio of the size of the capacitor configured to stabilize the voltage supplied from the battery to the size of the entire inverter is very high. Thus, the capacitor is an obstacle to the downsizing of the electric power steering device.

Moreover, as the motor to be provided in the electric power steering device, a permanent-magnet synchronous motor is often used from the requirement for the downsizing of the motor. A decrease in power factor occurs as the rotation speed of the motor increases in the permanent-magnet synchronous motor. Thus, it is required to reduce the current flowing through the capacitor in a wide range of the power factor in order to reduce the capacitor current.

However, with the control method described in Patent Literature 1, when the power factor has become equal to or smaller than the threshold value, the use of the PWM control for reducing the capacitor current is required to be stopped. Thus, even when the control method described in Patent Literature 1 is applied to the electric power steering device, it is difficult to achieve the downsizing of the capacitor.

In contrast, it is possible to reduce the current flowing through the capacitor in the wide range of the power factor by applying the power conversion device according to any one of the first to fifth embodiments to the electric power steering device. As a result, the downsizing of the capacitor can be achieved, and such a remarkable effect as contribution to the downsizing of the electric power steering device is provided.

As described above, the electric power steering device according to the sixth embodiment includes the power conversion device of any one of the first to fifth embodiments. As a result, the downsizing of the capacitor can be achieved, and such a remarkable effect as contribution to the downsizing of the electric power steering device is provided.

REFERENCE SIGNS LIST 1 motor, 2 position detector, 3 DC power supply, 4 capacitor, 5 inductance, 6 inverter, 7 current detector, 8 controller, 9 coordinate converter, 10 subtractor, 11 subtractor, 12 current controller, 13 current controller, 14 coordinate converter, 15 current-vector phase calculator, 16 on/off signal generator, 101 steering wheel, 102 front wheel, 103 torque detector, 104 gear, 105 control command generator

The invention claimed is:

1. A power conversion device, comprising:
    an inverter, which includes a plurality of semiconductor switching elements, and is configured to invert a direct current (DC) voltage output from a DC power supply into three-phase alternating current (AC) voltages by the respective semiconductor switching elements being switched on and off, to output the three-phase AC voltages;
    a capacitor provided in parallel between the DC power supply and the inverter; and
    a controller configured to calculate voltage command values, which are command values for the three-phase AC voltages to be output from the inverter, based on an input control command value, and to output on/off signals for switching on and off the respective semiconductor switching elements of the inverter in accordance with the calculated voltage command values,
    wherein the controller is configured to identify, among a plurality of voltage vectors that correspond to patterns of the on/off signals, a first voltage vector, a second voltage vector, and a third voltage vector that are most closest, second closest, and third closest to a current vector in phase, respectively, and generate the on/off signals based on the second voltage vector and the third voltage vector.

2. The power conversion device according to claim 1, wherein the controller is configured to:
    compare a carrier wave with each of the voltage command values, to thereby output the on/off signal;
    employ a lower solid two-phase modulation as a voltage modulation method when the first voltage vector closest in phase to the current vector is a voltage vector formed by, out of the plurality of semiconductor switching elements, turning on two semiconductor switching elements on a high electric potential side and turning on one semiconductor switching element on a low electric potential side; and
    employ an upper solid two-phase modulation as the voltage modulation method when the first voltage vector closest in phase to the current vector is a voltage vector formed by, out of the plurality of semiconductor switching elements, turning on one semiconductor switching element on the high electric potential side and turning on two semiconductor switching elements on the low electric potential side, and
    wherein the controller is configured to:
        when the lower solid two-phase modulation is employed, equally shift the voltage command values so that a minimum voltage command value out of the voltage command values matches a minimum value of a plurality of carrier waves, set one phase of remaining two phases other than a minimum phase in which the voltage command value is minimum out of three phases as a carrier wave inverted phase, and invert the carrier wave in the carrier wave inverted phase about a center value as a reference with respect to the carrier wave in another phase of the remaining two phases; and
        when the upper solid two-phase modulation is employed, equally shift the voltage command values so that a maximum voltage command value out of the voltage command values matches a maximum value of the plurality of carrier waves, set one phase of remaining two phases other than a maximum phase in which the voltage command value is maximum out of the three phases as a carrier wave inverted phase, and invert the carrier wave in the carrier wave inverted phase about a center value as a reference with respect to the carrier wave in another phase of the remaining two phases.

3. The power conversion device according to claim 2, wherein the controller is configured to:
    set the carrier wave as a sawtooth wave;
    switch the carrier wave inverted phase from the one phase to the another phase at a center of a lower solid two-phase modulation section, in which the lower solid two-phase modulation is employed; and
    switch the carrier wave inverted phase from the one phase to the another phase at a center of an upper solid two-phase modulation section, in which the upper solid two-phase modulation is employed.

4. The power conversion device according to claim 1, wherein the controller is configured to:
    compare a carrier wave and each of the voltage command values, to thereby output the on/off signal; and
    set a frequency of the carrier wave in a middle phase having a second largest voltage command value out of three phases so as to be twice as high as a frequency of the carrier waves in remaining two phases other than the middle phase.

5. The power conversion device according to claim 2, wherein the control command value is a current command value of current to be supplied to a motor to which the three-phase AC voltages are to be applied, and
    wherein the controller is configured to, when the current command value is equal to or smaller than a threshold value set in advance:
        set phases of the plurality of carrier waves so as to be in phase in the remaining two phases other than the minimum phase in a lower solid two-phase modulation section, in which the lower solid two-phase modulation is employed; and
        set phases of the plurality of carrier waves so as to be in phase in the remaining two phases other than the maximum phase in an upper solid two-phase modulation section, in which the upper solid two-phase modulation is employed.

6. The power conversion device according to claim 4, wherein the control command value is a current command value of current to be supplied to a motor to which the three-phase AC voltages are to be applied, and
    wherein when the current command value is equal to or smaller than a threshold value set in advance, the controller sets the frequency of the carrier wave in the middle phase so as to match the frequency of the carrier waves in the remaining two phases other than the middle phase.

7. The power conversion device according to claim 5, wherein, in a case in which the current command value is set to a rated current value of current to be supplied to the motor, a maximum value of a current flowing through the capacitor when the carrier wave is inverted is set as a first maximum value and a maximum value of the current flowing through the capacitor when the plurality of carrier waves are in phase is set as a second maximum value, the threshold value is set based on a ratio of the first maximum value to the second maximum value and on the rated current value.

8. The power conversion device according to claim 1,
wherein the control command value is a control command value directed to a motor to which the three-phase AC voltages are to be applied,
wherein the motor is a permanent-magnet synchronous motor; and
wherein the controller is configured to obtain the phase of the current vector based on a rotation position of the permanent-magnet synchronous motor.

9. An electric power steering device, comprising:
the power conversion device of claim 1, and further comprising a motor;
a torque detector configured to detect a steering torque of the electric power steering device; and
wherein the control command value controls the motor based on the detected steering torque.

* * * * *